US012462651B2

(12) United States Patent
Choffray et al.

(10) Patent No.: US 12,462,651 B2
(45) Date of Patent: Nov. 4, 2025

(54) INTERACTIVE SLOT GAME WITH CROSS-DEVICE SYNCHRONIZATION AND SEQUENTIAL REEL REVELATION

(71) Applicant: GAMING1, Liège (BE)

(72) Inventors: Jean-Christophe Choffray, Neupré (BE); Christophe Bonivér, Beaufays (BE); Sylvain Bonivér, Beaufays (BE)

(73) Assignee: GAMING1, Liège (BE)

( * ) Notice: Subject to any disclaimer, the term of this patent is extended or adjusted under 35 U.S.C. 154(b) by 278 days.

(21) Appl. No.: 18/136,345

(22) Filed: Apr. 19, 2023

(65) Prior Publication Data

US 2024/0013624 A1 Jan. 11, 2024

Related U.S. Application Data

(60) Provisional application No. 63/358,661, filed on Jul. 6, 2022.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ............. G07F 17/3213; G07F 17/3258; G07F 17/326; G07F 17/3265; G07F 17/34; G07F 17/3267
See application file for complete search history.

(56) References Cited

U.S. PATENT DOCUMENTS 6,186,894 B1 * 2/2001 Mayeroff ................ G07F 17/34 463/16
8,317,601 B1 * 11/2012 Luciano, Jr. .......... G07F 17/326 463/16
2005/0159208 A1 * 7/2005 Pacey ................. G07F 17/3211 463/20
2011/0098099 A1 * 4/2011 Acres ...................... G07F 17/34 463/20
2012/0172107 A1 * 7/2012 Acres ...................... G07F 17/34 463/16
2013/0184064 A1 * 7/2013 Manning ................. G07F 17/32 463/32
2013/0288772 A1 * 10/2013 Kitamura ............ G07F 17/3267 463/20
2015/0161852 A1 * 6/2015 Robbins .............. G07F 17/3274 463/20
2015/0348355 A1 * 12/2015 Caputo ............... G07F 17/3227 463/31

* cited by examiner

*Primary Examiner* — Justin L Myhr
(74) *Attorney, Agent, or Firm* — XSENSUS LLP

(57) ABSTRACT

An interactive slot game characterized by a display of one or multiple grids receives input corresponding to initiating a turn for a slot game, in response to the received input initiating the turn for the slot game, randomly draws symbols for reels of the slot game, displays a reel to be placed in a grid of the one or multiple grids and hides all the remaining reels in a queue, wherein the reels remain hidden until it is placed in one of the available grids of the system, and wherein the reel placement is based on a personal choice of the player. After the reel is placed, reveal a reel in the queue and symbols corresponding to that reel, and receive next reel placement input based on a choice of the player, wherein the reel placement input defines in which grid of the slot game interface the reel is placed.

17 Claims, 29 Drawing Sheets

405

440

400

405

410

405

425

405

430

405

435

405

440

405

445

405

450

405

455

405

460

405

475

405

480

405

485

405

490

500

505

500

510

500

500

500

525

515

500

530

515

500

500

500

500

500

565

515

500

570

515

*Fig. 5O*
QUARTER
MILLION
FRUIT
JACKPOT
LAST WINNER
POINTS TABLE
POINTS / PRIZES
CREDITS:
STAKE:
TOTAL POINTS:
20
MYSTERY:
START
20
PLAY AGAIN

500

580

600

605

600

610

INTERACTIVE SLOT GAME WITH CROSS-DEVICE SYNCHRONIZATION AND SEQUENTIAL REEL REVELATION

CROSS-REFERENCE TO RELATED APPLICATION

This application claims the benefit of U.S. Provisional Application No. 63/358,661, filed Jul. 6, 2022, which is incorporated herein by reference in its entirety.

FIELD OF THE DISCLOSURE

The present disclosure relates to an apparatus and associated methodology for slot games.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A slot game is a gambling game with spinning reels. Those reels have symbols on them, which land randomly in one single grid, and without any personal choice of the player, after the player places a bet and spins the reels. If these symbols line up, the player wins prizes based on which symbols fall on the pay lines. Values of the symbol are defined in the pay table of the game. Pay lines and the game features are explained in the game rules. Online slot games are much more flexible than land-based machines and have various additional features such as wild symbols, scatter symbols, increased number of symbols, reels, and/or pay lines, interactive bonus rounds with mini-games, progressive jackpots, and the like.

Although the symbols, designs, and features vary in slot games, few slot game providers offer original content and formats. Slot games are traditionally the same, particularly regarding slot game mechanics. For example, in existing slot games, the player discovers the result of the symbols draw for all reels after a single action of spinning the reels, and the reel's position in the game interface is defined in advance and cannot be changed.

SUMMARY

According to aspects of the disclosed subject matter, an interactive slot game is characterized by a display of one or multiple grids and includes processing circuitry configured to receive input corresponding to initiating a turn for a slot game, in response to the received input initiating the turn for the slot game, randomly draw symbols for reels of the slot game, display only one of the reels and hide all the remaining reels in a queue, wherein the reels remain hidden until a predetermined action is performed by the slot game, where the predetermined action corresponds to placing the reel in one of the available grids of the system, and where the reel placement is based on a personal choice of the player, in response to the predetermined action of reel placement, reveal a reel in the queue and symbols corresponding to that reel, receive next reel placement input based on a choice of the player, wherein the reel placement input defines in which grid of the slot game interface the reel is placed in, calculate points won for each of the grids in which the reels are placed, and may calculate points won for each special combination or feature, compile all points won, and convert the total points won into final winnings for that turn of the slot game.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
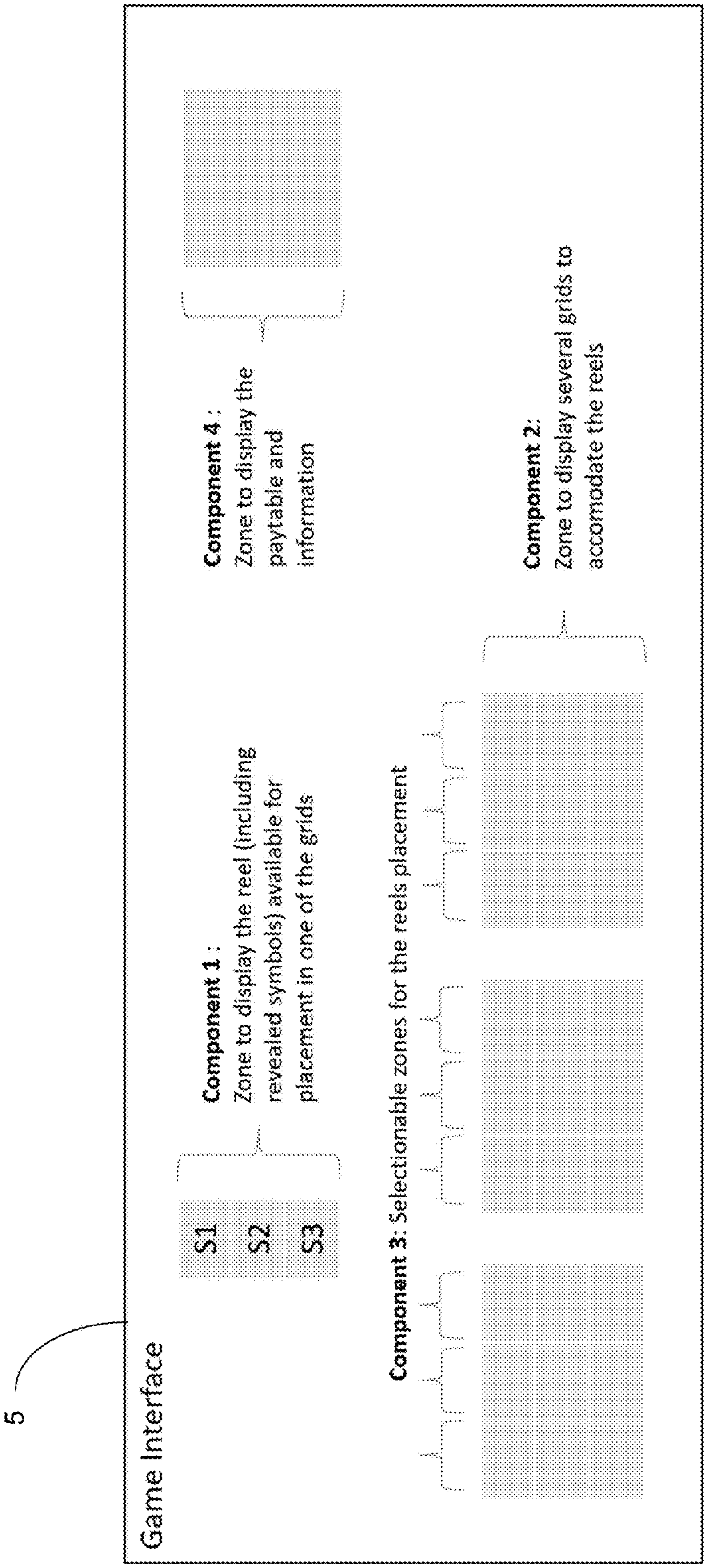
FIG. 1 illustrates an exemplary overview of components of a game interface for the slot game system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

FIG. 1 illustrates an exemplary overview of components of a game interface 5 for the slot game system according to one or more aspects of the disclosed subject matter.

Generally, the slot games described herein include slot games where the result of the symbols draw is known for each reel (e.g., component 1) sequentially, one reel at a time, and where the player is offered several empty slot interfaces, that is empty grids (e.g., component 2), to place each of the obtained reels. In other words, the player makes a decision about where to place each reel in the interface (e.g., component 3). For example, if the interface has one grid with three empty columns, the player can place the first reel in any column in the grid, the second reel in any remaining column, and so on. In another example, if the interface has three grids with a total of nine empty columns (e.g., FIG. 1), the player can place the first reel in any column of any grid, the second reel in any remaining column in any grid, and so on. The reel placement is based on a personal choice rather than on a random output of the system. Additionally, the player must place the 1st obtained reel before knowing the symbols draw for the next reel, and so on for each remaining reel. At the end of one spin, the player has completed all the grids displayed (e.g., 3 grids in FIG. 1). Each grid involves pay lines like individual classical slot games. If the symbols line up, the player wins prizes based on which symbols fall on that pay line. However, winning lines of each grid are converted into points, rather than directly into a final cash prize. The points obtained for each winning grid are cumulated. The spin of a slot game described herein leads to a win only when the cumulated number of points obtained in all the individual grids reaches a minimum threshold associated to winnings according to the game pay table (e.g., component 4). It is up to the player to make the best decisions to maximize the chances to reach that threshold, based on his/her skills.

In typical slot games, the player plays with one slot game at a time and slot games are independent from one another. In contrast, with the slot games described herein, for each spin, the players are offered with the reels to fill in several classical slot interfaces, which are presented as empty grids. As a result, the player can accommodate the reels to align the best symbols.

For example, the slot game mechanics described herein are designed to offer players a more interactive and engaging experience. The slot game mechanics rely on several elements including: 1) Display of several grids to accommodate the reels, 2) The player decides for the placement of the reels obtained, 3) Discovering of the reel symbols, one reel at a time, between each placement decision, and 4) A computation of the intermediate points won to determine the final prize. This incredible combination increases both personal action of the players and suspense until the last reel is placed in the last grid of the spin. This game specificity inevitably brings a breath of fresh air and novelty in the field of slot machines.

The present disclosure describes slot game gaming mechanics for a slot game system 100 (see FIG. 2) designed to involve the player in building the slot interfaces (for example, multiple grids) by deciding on the reel's positioning on these interfaces. In one aspect, the slot game and slot game mechanics can be Gridders™ Slot. In contrast, in traditional existing slot games, the player is always passive regarding the visual architecture of the reels. Classical slot games are based on a predefined display of the reels on the slot interface. In the slot game mechanics for the slot game system 100, the player is at the heart of the slot machines and contributes to their design. For each reel that is revealed, the player decides in which grid to place it. Depending on the reels that have already been placed, new placement options are restrained and decrease until all grids are completed.

The grids represent empty slot interfaces where reels are missing. It is only after the player has positioned the reels in a grid that this slot interface is complete. The number of grids presented in the slot game system 100 can vary from 1 to n. In one aspect, the number of grids is 4.

Existing slot games are based on a single action from the player. For example, the player spins the reels, and all the symbols of each reel are revealed before the next action of spinning is started. The symbols may be revealed in a unique animation. However, in the slot game system 100, the player spins the reels but discovers the result of the symbols draw only one reel at a time. The next reel and its symbols are revealed only once the previous reel has been placed in the game as a result of a personal decision of the player. In other words, the game interface receives a reel placement in a column of a grid selected by the player. The player performs multiple reel placements. Each action to place a reel also leads to revealing the next reel's symbols.

In one aspect of the slot game system 100, the player must place the 1st obtained reel before knowing the symbols draw for the next reel, and so on for each remaining reel.

For each spin of the slot game system 100, when the player spins the reels, the number of reels displayed is lower than the available spots in the grids. In one embodiment, the reels are revealed one by one. Alternatively, or additionally, in one embodiment, reels are revealed by group of reels.

For each spin of the slot game system 100, the player is presented with some empty grids. Each grid is considered as an individual slot interface associated to pay lines. In classical slot games, reels are associated to only one single slot interface with its pay lines. Even when several slot interfaces are included in a single slot game, each interface is associated to its own reels. In the slot game system 100, reels can be placed into either one or another available slot interface, each being identified by its own pay lines. The reels are not associated to a specific grid before the player has taken the decision regarding the reel's placement.

For each spin of the slot game system 100, when the player spins the reels, the number of reels considered fits with the number of available grids such that all grids can be completed with a single draw of symbols. In some embodiment, the number of reels and their symbols are equal to the number of available spots in the grids. In some other embodiment, the number of reels and their symbols are above the number of available spots in the grids.

If the symbols line up in a specific grid of the slot game system 100, the player wins points of a certain value based on which symbols fall on that pay line. The cumulated number of points obtained in all the grids of a spin defines which prize is won. The spin of the slot game system 100 leads to a win only when the cumulated number of points reaches a minimum threshold associated to winnings. The player should consider this criterion to adopt the best decisions to maximize the chances to reach that threshold, based on his/her skills with regards to the placement of the reels. For example, a partially filled in grid may benefit from the placement of the next reel (i.e., the player would earn points by placing the reel in that grid) so the player may strategically place the reel in that grid to earn points. However, if the current reel does would not earn the player any points by placing it in an existing partially filled grid, the player may want to strategically place the reel in an empty grid (if there is an empty grid available) to increase their chances that the next reel that is revealed will earn points in one or more of the partially completed grids. The prizes are defined in the game pay table.

On top of its specificity, the slot game system 100 can also offer as much diversity as any classical slot games, by offering various game features, bonus games, special symbols, and/or specific/special combinations leading to surprises in-game. These events also result into winnings, points, and/or prizes. Examples of special combinations can be that the total amount of points is multiplied by 1.5 if players manage to make a winning line in 3 different grids; The total amount of points is multiplied by 2 if players manage to make a winning line in all 4 grids; or players win 200 extra points if they manage to fill a grid with 9 identical symbols. An example of a bonus game might be a wheel game triggered by aligning 3 bonus symbols in a grid. The players spin the wheel, which stops on 1 of a series of panels, allowing them to win points or a jackpot. An example of a feature and a special symbol might be that for each winning grid, players are rewarded with the appearance of a Wild symbol which replaces one of the 9 symbols on the grid.

The slot game system 100 is composed of key elements that can be considered together: several grids to accommodate the reels, the reel placement decided by the player, the discovering of the reel symbols, one reel or group of reels at a time, between each placement decision, and the computation of intermediate points won to define the final prize. This combination is advantageous for several reasons as described herein.

Figure 2:
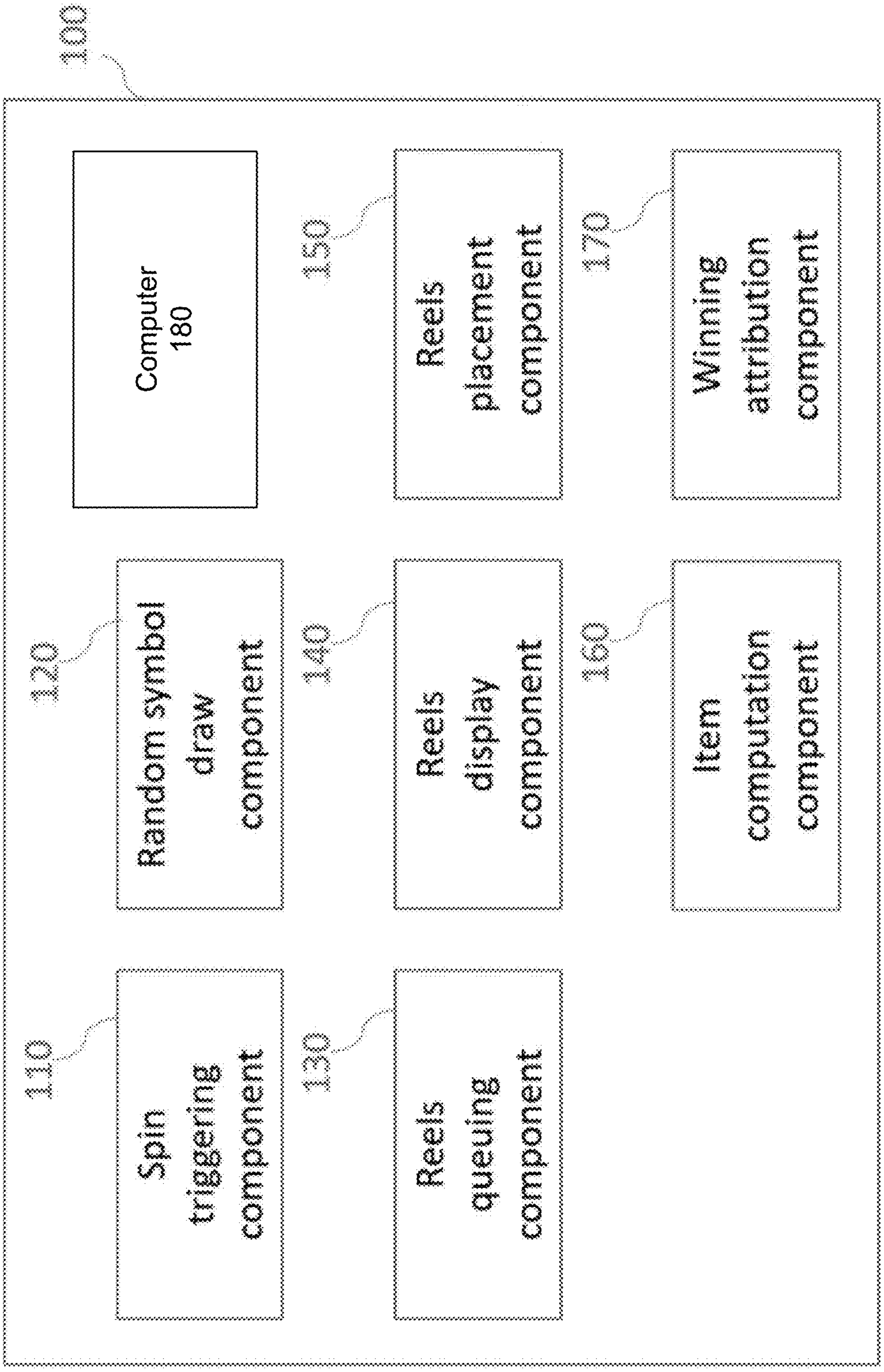
FIG. 2 illustrates a block diagram of a sequential accommodation of the functional components of the slot game system according to one or more aspects of the disclosed subject matter.

FIG. 2 illustrates a block diagram of a sequential accommodation of the functional components of the slot game system 100 according to one or more aspects of the disclosed subject matter. The slot game system 100 includes:

- A spin component such as a spin button to trigger the random symbol draw for the symbols of the reels that are to-be-placed in the grids (component 110);
- A random symbol draw component that is responsible for the randomness of the symbols drawn (component 120);
- A reel queuing component that is devoted to keep the reels unrevealed to the player, if needed, until the required action is performed (component 130);
- A reel display component that is devoted to reveal the reel and its symbols once released from the reel queuing component (component 140);
- A reel placement component that defines the action through which the player can indicate where to place the available revealed reel (component 150);
- A points computation component that computes the points won for each grid (component 160);
- A winning attribution component that attributes the final winnings (component 170). The component 170 may also render a software-based animation to signal the player that the spin is winning and to provide a level of excitement to the event of winning; and
- A computer 180.

Figure 3:
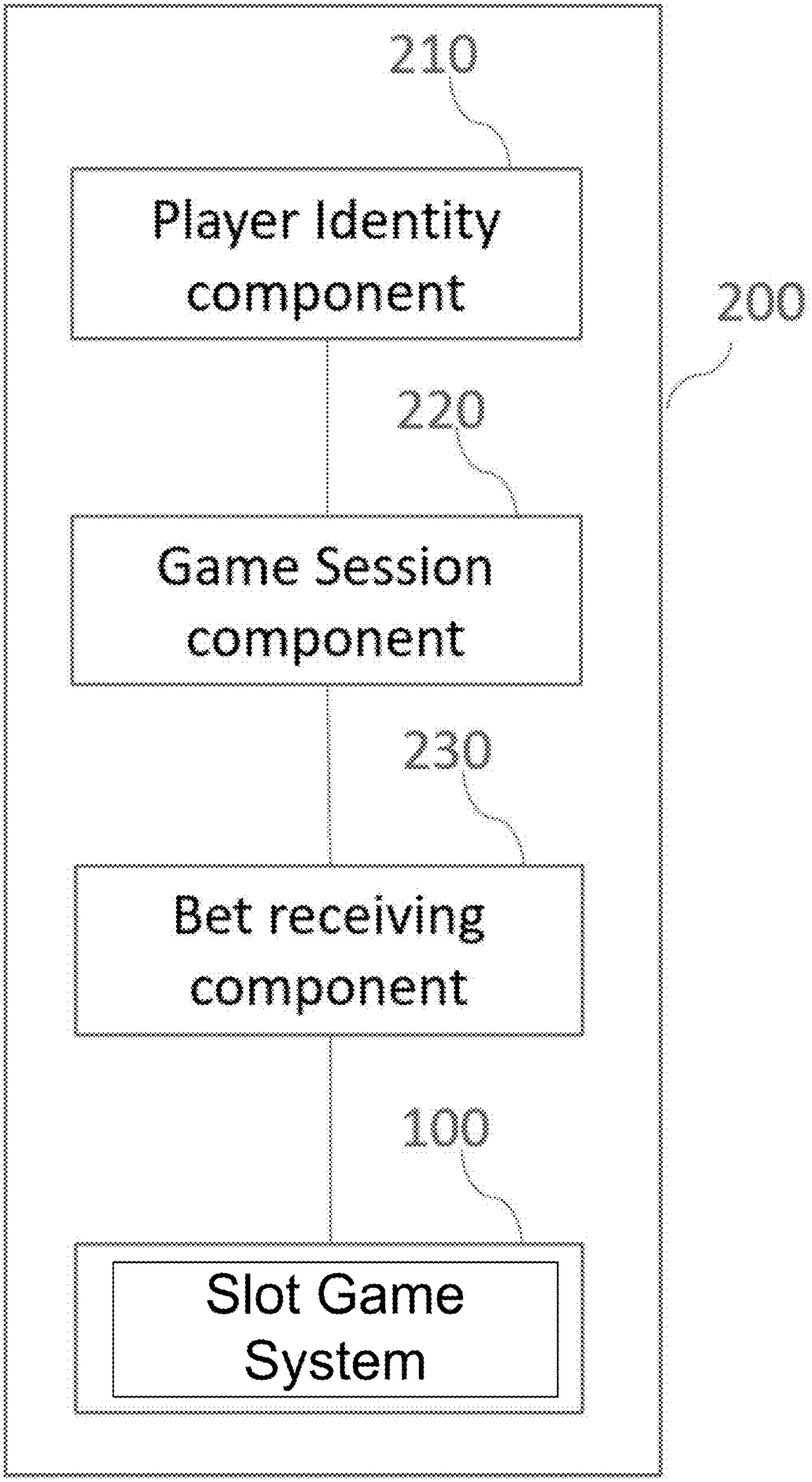
FIG. 3 illustrates game components of a global online remote gambling system according to one or more aspects of the disclosed subject matter.

FIG. 3 illustrates game components of a global online remote gambling system 200 according to one or more aspects of the disclosed subject matter. The system 200 includes a player identity component 210, a game session component 220, a bet receiving component 230, and the slot game system 100.

The system 200 maintains a stored user profile for each player to maintain information about the game sessions, the bets and the wins, and all game history details.

The player identity component 210 identifies a player playing a game. It may store data, such as contact information for each player (e.g., email, phone, or other information), payment information both for receiving and sending payments, where the player resides to enforce any jurisdiction-specific game rules), and so forth. Component 210 can identify a player by asking the player to login (e.g., provide a username and password), by receiving biometric information (e.g., a fingerprint, facial ID, or other identifier), by the player swiping a gaming card, or by other available methods of differentiating one player from another.

The game session component 220 manages an instance of the player playing the game. A session is identified by a location, a game, and a period during which the player is playing. A player's engagement with the system 200 may span multiple game sessions. A game session starts when the player accesses a game associated with the system 200 and the system 200 identifies the player as a known user. The game session ends when the player indicates that they quit the game. The player may have multiple game sessions per day. If the player quits the game in a middle of a spin, the system ensures that no data are lost (e.g., store the position of placed reels, store the remaining reels in the queue, etc.), and the initiated spin (i.e., turn) continues where it was stopped (recovery). If the player switches from one device to another, whether the slot game is in a middle of a spin or between 2 spins, the system 200 ensures that the player can continue the game, as if no change in the device to access the game occurred. Balance, bets, and game history are still available.

The bet receiving component 230 receives a wager for each bought spin. The bet may be variable depending on the player's own estimation of likely success for the next game (e.g., the player may bet one dollar on some turns and five dollars on others). Bets may come from the player's cash or may come from one or more accounts stored in the player's profile managed by the player identity component 210 (e.g., a credit card or checking account).

The bet receiving component provides the bet information to the slot game system 100, which uses it and adapts the values displayed in the pay table and game rules accordingly. The amount of the prizes and winnings are also adapted as a function of the bet received.

Figure 4A:
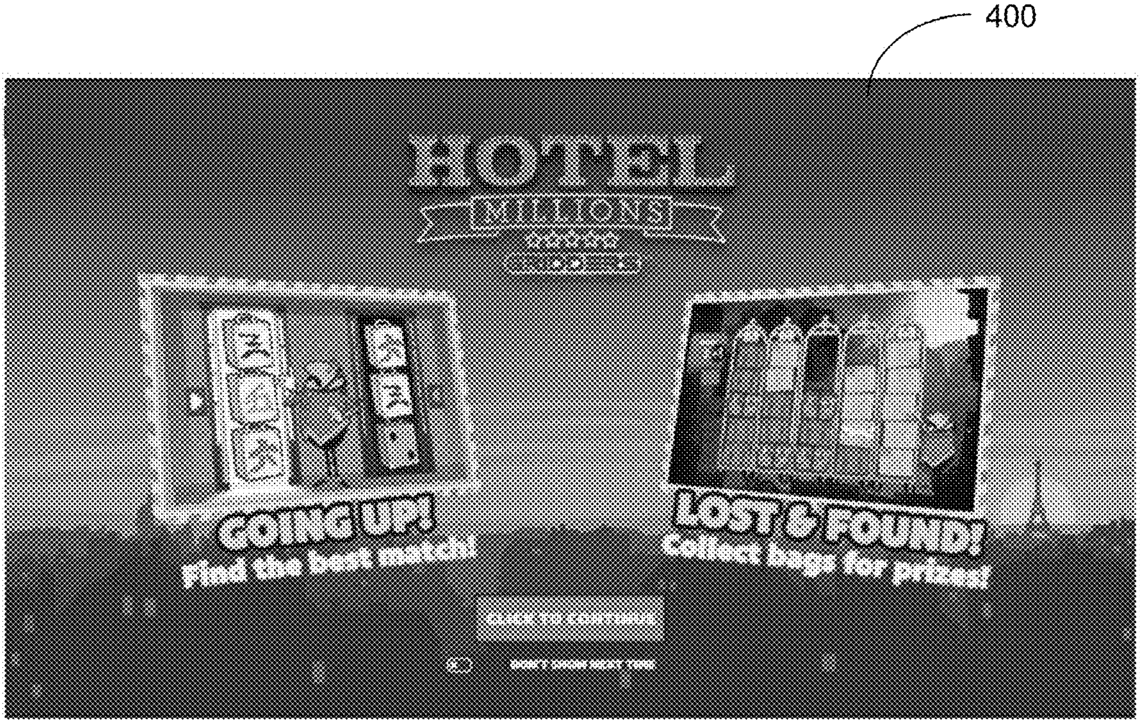
FIG. 4A illustrates a welcome screen displaying a slot game according to one or more aspects of the disclosed subject matter.

FIG. 4A illustrates a welcome screen 400 displaying a slot game according to one or more aspects of the disclosed subject matter.

Figure 4B:
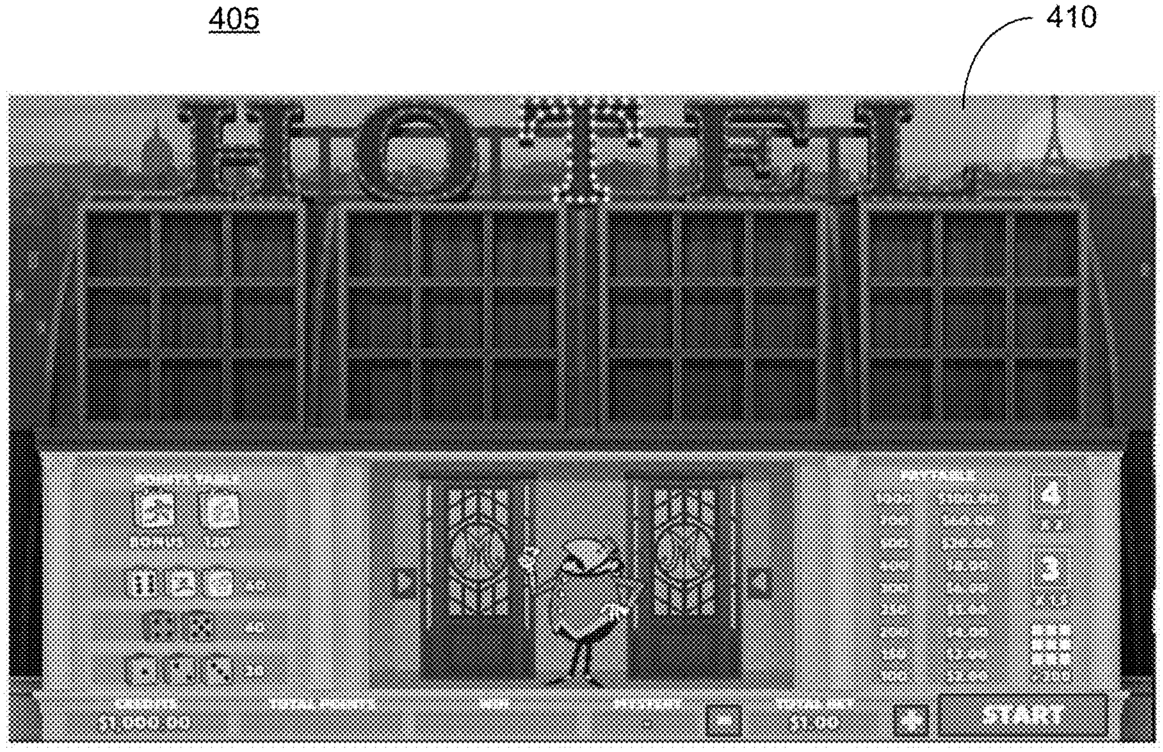
FIG. 4B illustrates a game interface displaying a start screen for the slot game according to one or more aspects of the disclosed subject matter.

FIG. 4B illustrates a game interface 405 displaying a start screen 410 for the slot game according to one or more aspects of the disclosed subject matter.

Figure 4C:
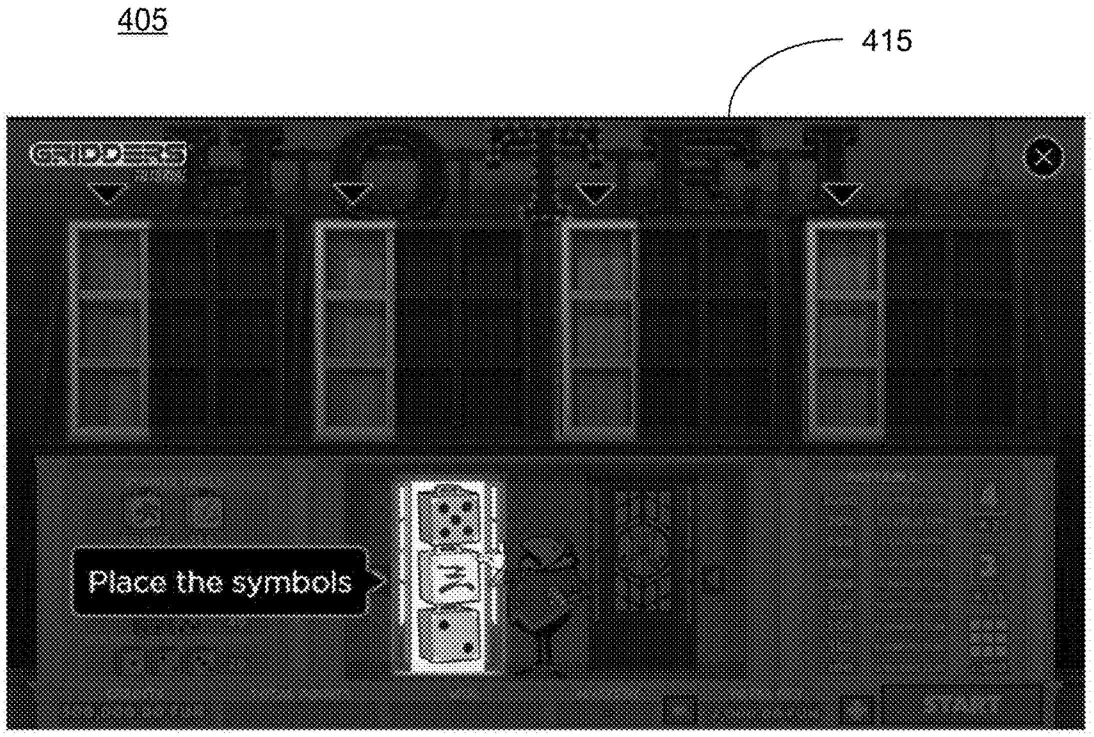
FIG. 4C illustrates the game interface displaying a first tutorial screen for the slot game according to one or more aspects of the disclosed subject matter.

FIG. 4C illustrates the game interface 405 displaying a first tutorial screen 415 for the slot game according to one or more aspects of the disclosed subject matter.

Figure 4D:
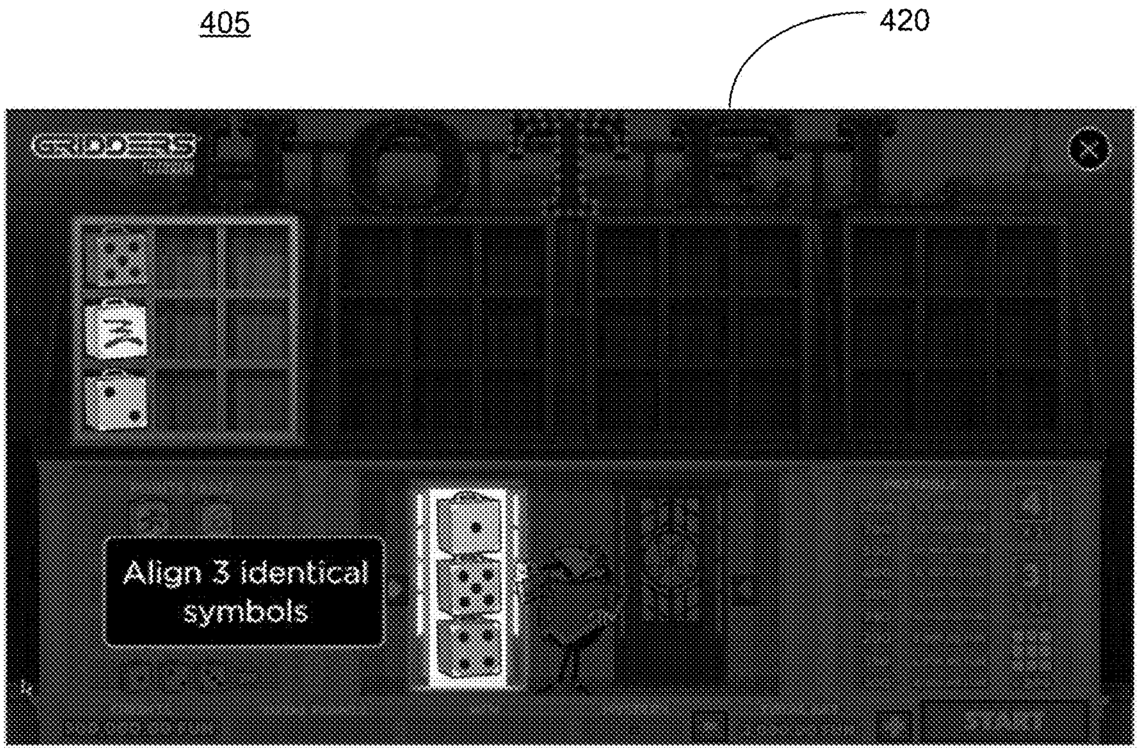
FIG. 4D illustrates the game interface displaying a second tutorial screen for the slot game according to one or more aspects of the disclosed subject matter.

FIG. 4D illustrates the game interface 405 displaying a second tutorial screen 420 for the slot game according to one or more aspects of the disclosed subject matter.

Figure 4E:
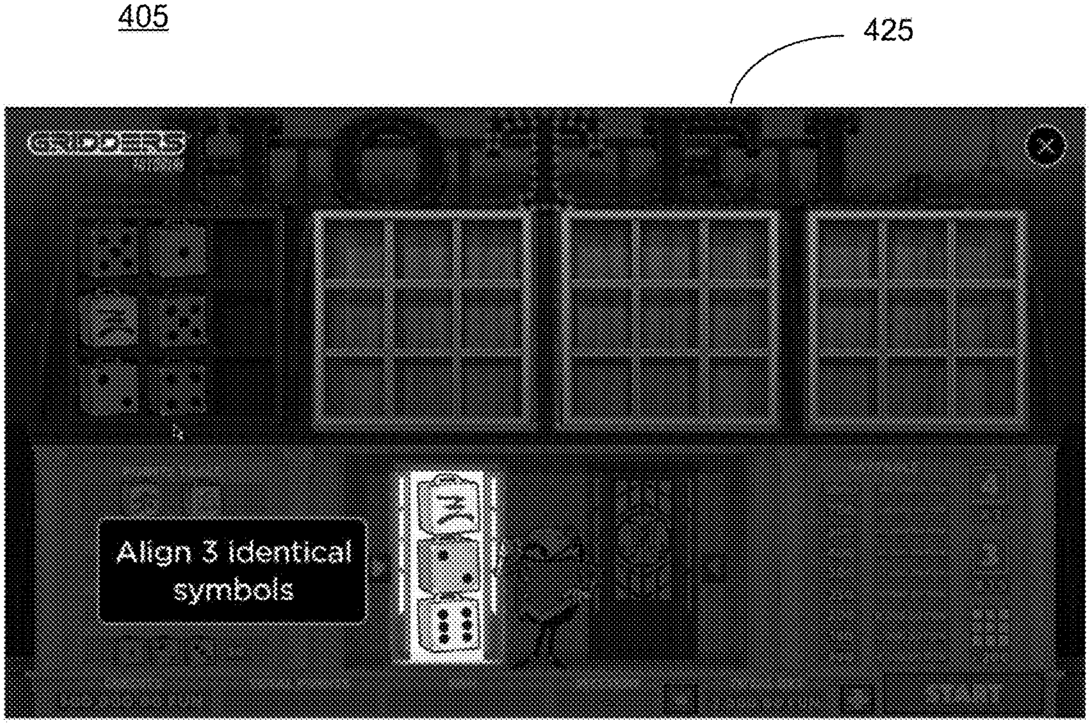
FIG. 4E illustrates the game interface displaying a third tutorial screen for the slot game according to one or more aspects of the disclosed subject matter.

FIG. 4E illustrates the game interface 405 displaying a third tutorial screen 425 for the slot game according to one or more aspects of the disclosed subject matter.

Figure 4F:
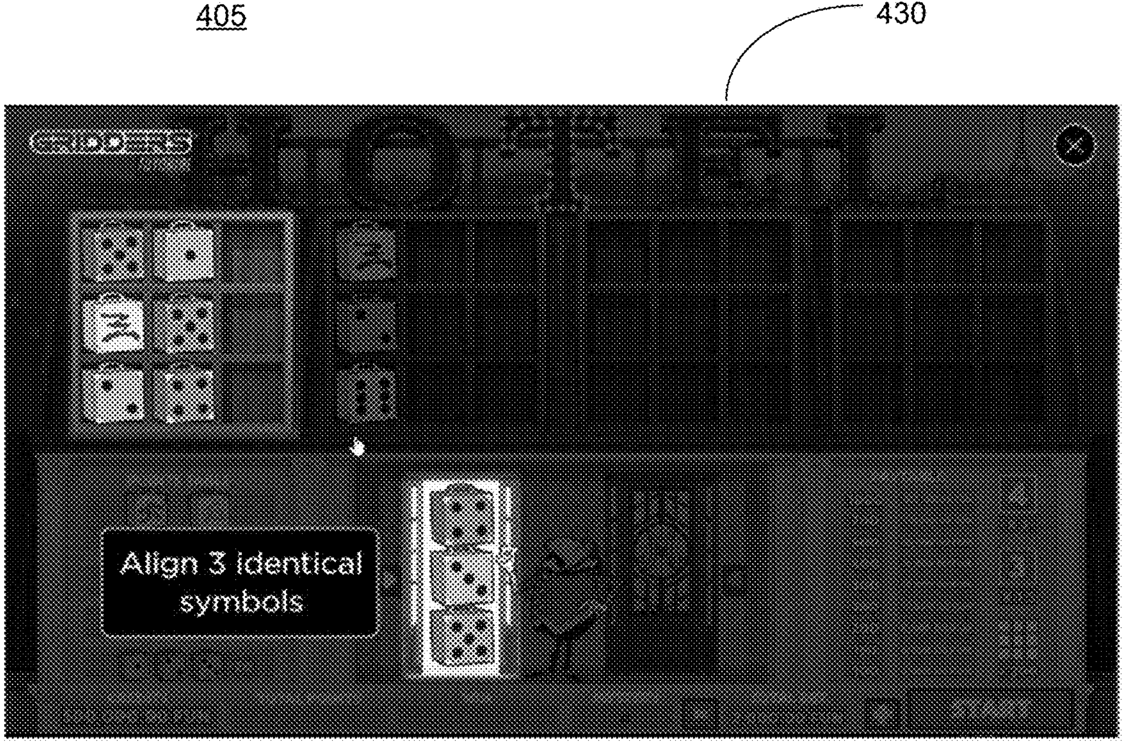
FIG. 4F illustrates the game interface displaying a fourth tutorial screen for the slot game according to one or more aspects of the disclosed subject matter.
Figure 4G:
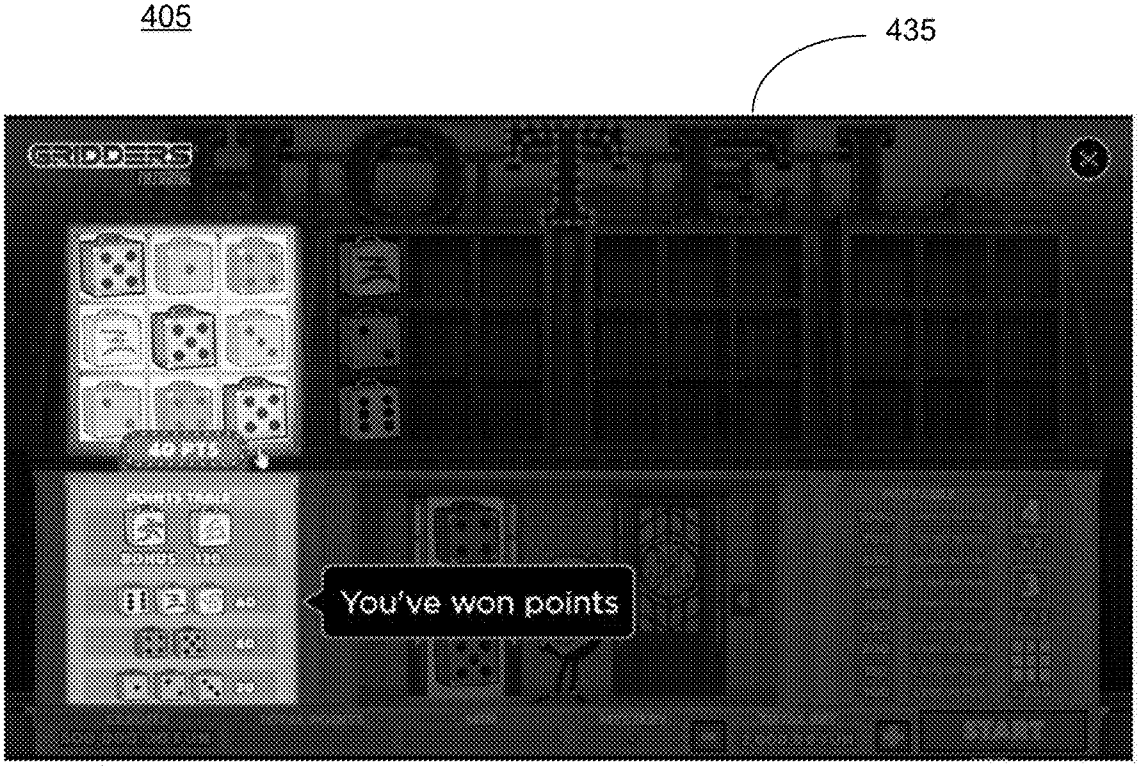
FIG. 4G illustrates the game interface displaying a fifth tutorial screen for the slot game according to one or more aspects of the disclosed subject matter.

FIG. 4F illustrates the game interface 405 displaying a fourth tutorial screen 430 for the slot game according to one or more aspects of the disclosed subject matter;

FIG. 4G illustrates the game interface 405 displaying a fifth tutorial screen 435 for the slot game according to one or more aspects of the disclosed subject matter.

Figure 4H:
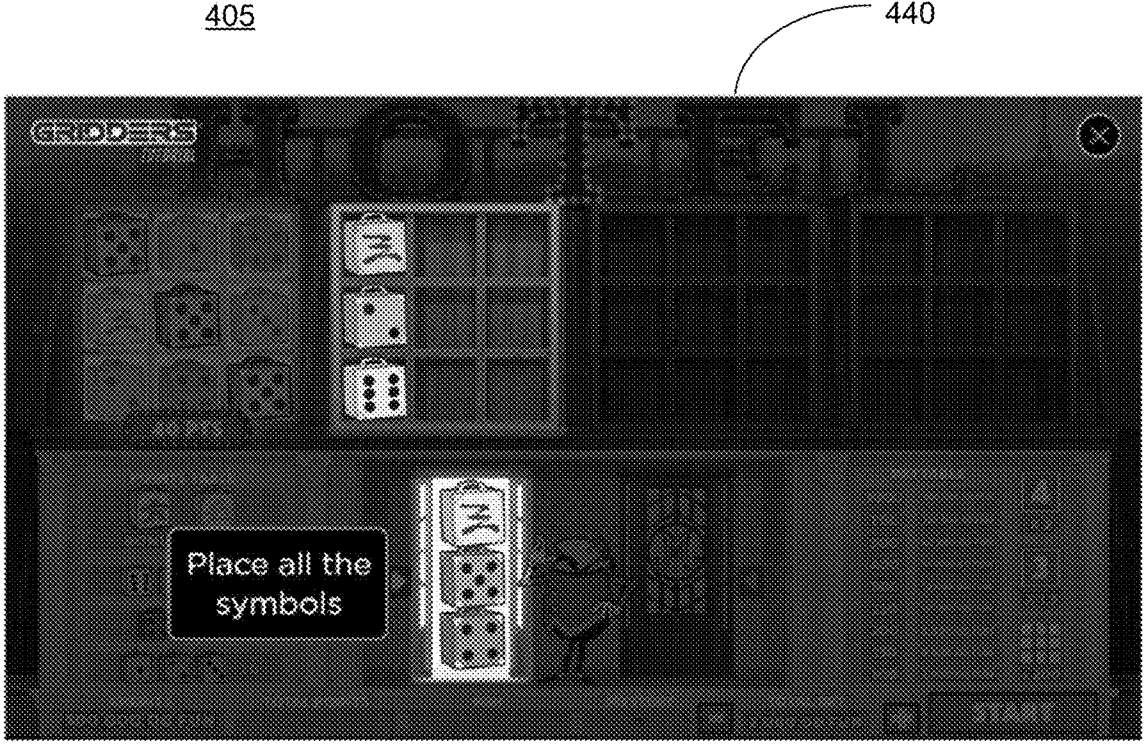
FIG. 4H illustrates the game interface displaying a sixth tutorial screen for the slot game according to one or more aspects of the disclosed subject matter.

FIG. 4H illustrates the game interface 405 displaying a sixth tutorial screen 440 for the slot game according to one or more aspects of the disclosed subject matter.

Figure 4I:
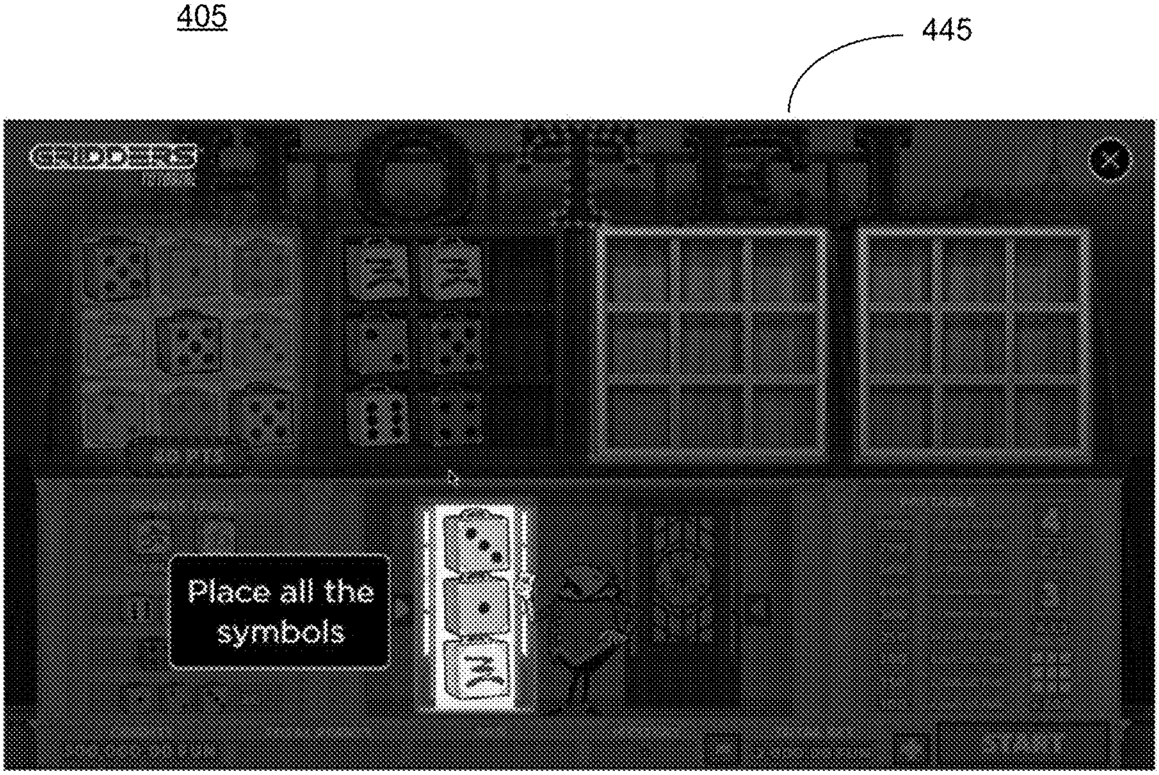
FIG. 4I illustrates the game interface displaying a seventh tutorial screen for the slot game according to one or more aspects of the disclosed subject matter.

FIG. 4I illustrates the game interface 405 displaying a seventh tutorial screen 445 for the slot game according to one or more aspects of the disclosed subject matter.

Figure 4J:
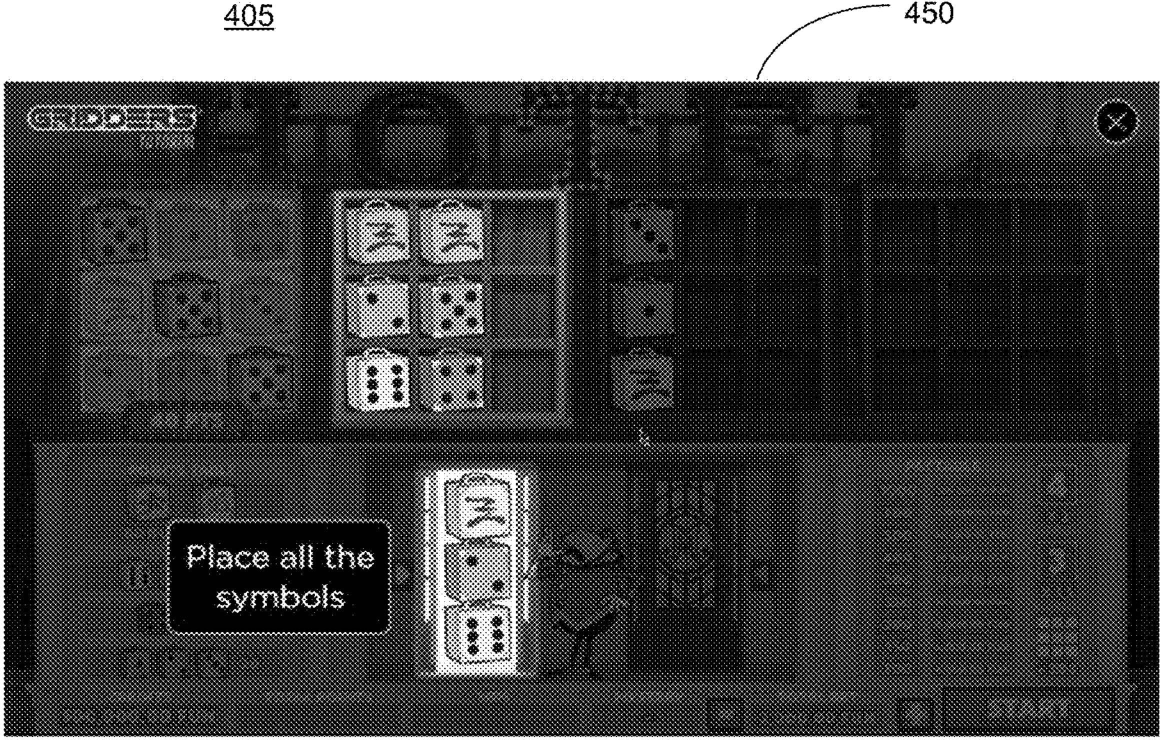
FIG. 4J illustrates the game interface displaying a eighth tutorial screen for the slot game according to one or more aspects of the disclosed subject matter.

FIG. 4J illustrates the game interface 405 displaying an eighth tutorial screen 450 for the slot game according to one or more aspects of the disclosed subject matter.

Figure 4K:
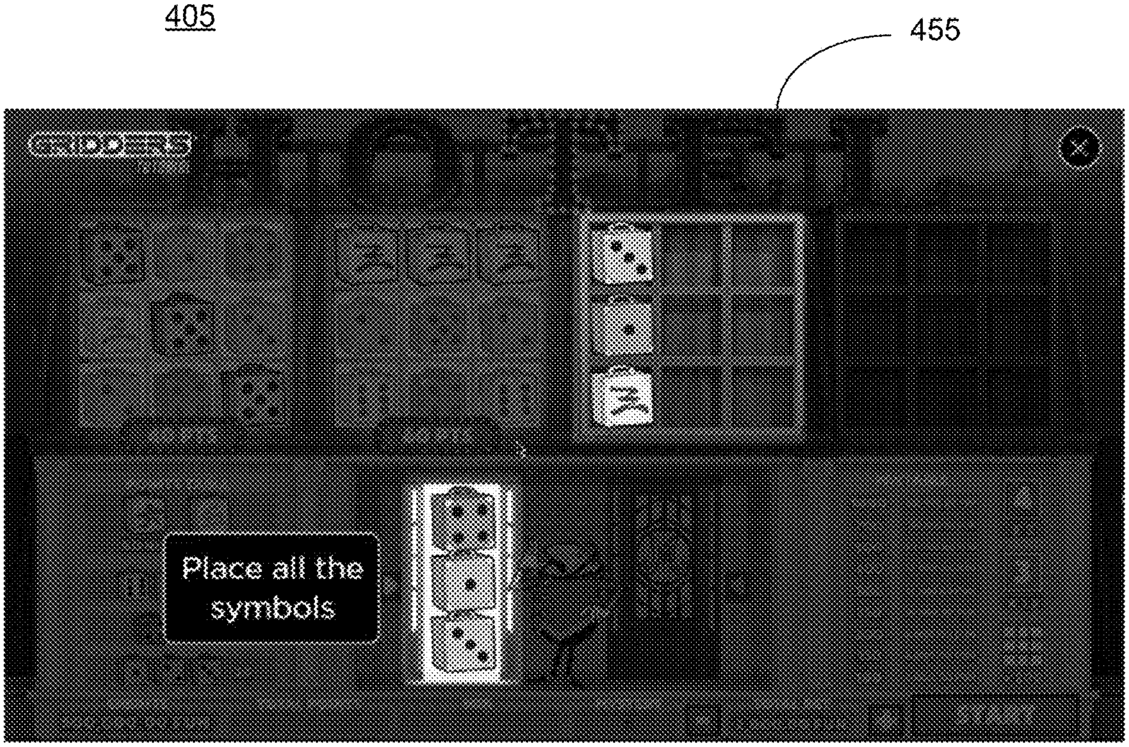
FIG. 4K illustrates the game interface displaying a ninth tutorial screen for the slot game according to one or more aspects of the disclosed subject matter.

FIG. 4K illustrates the game interface 405 displaying a ninth tutorial screen 455 for the slot game according to one or more aspects of the disclosed subject matter.

Figure 4L:
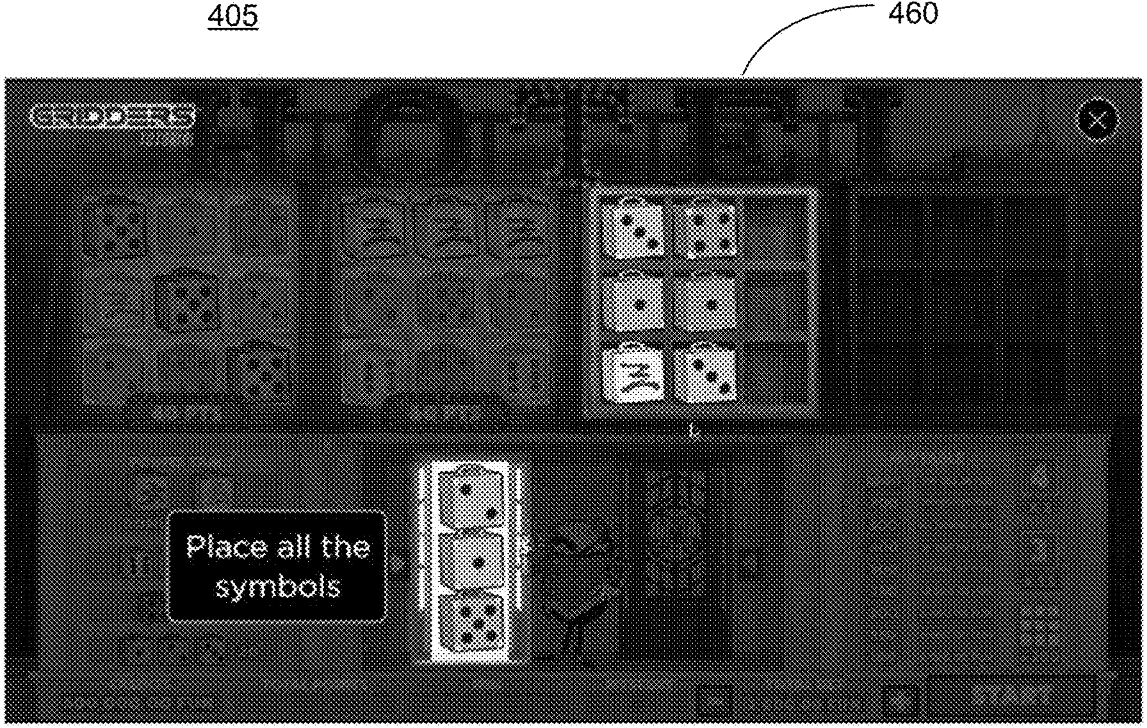
FIG. 4L illustrates the game interface displaying a tenth tutorial screen for the slot game according to one or more aspects of the disclosed subject matter.

FIG. 4L illustrates the game interface 405 displaying a tenth tutorial screen 460 for the slot game according to one or more aspects of the disclosed subject matter.

Figure 4M:
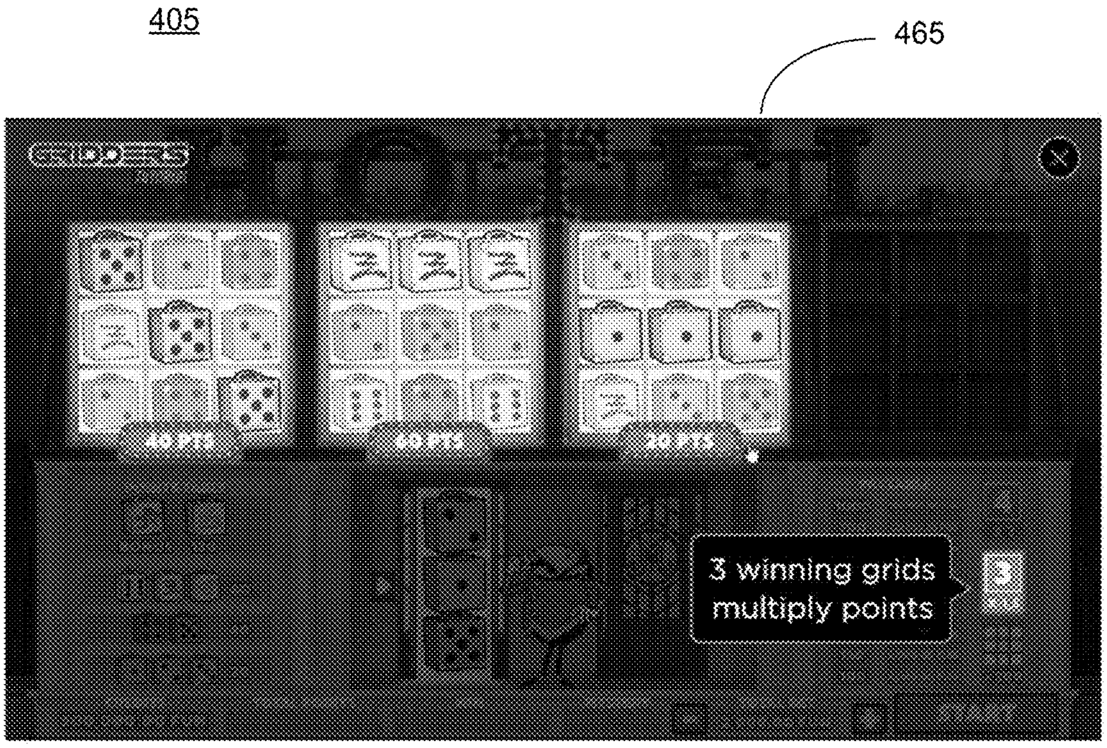
FIG. 4M illustrates the game interface displaying a eleventh tutorial screen for the slot game according to one or more aspects of the disclosed subject matter.

FIG. 4M illustrates the game interface 405 displaying an eleventh tutorial screen 465 for the slot game according to one or more aspects of the disclosed subject matter.

Figure 4N:
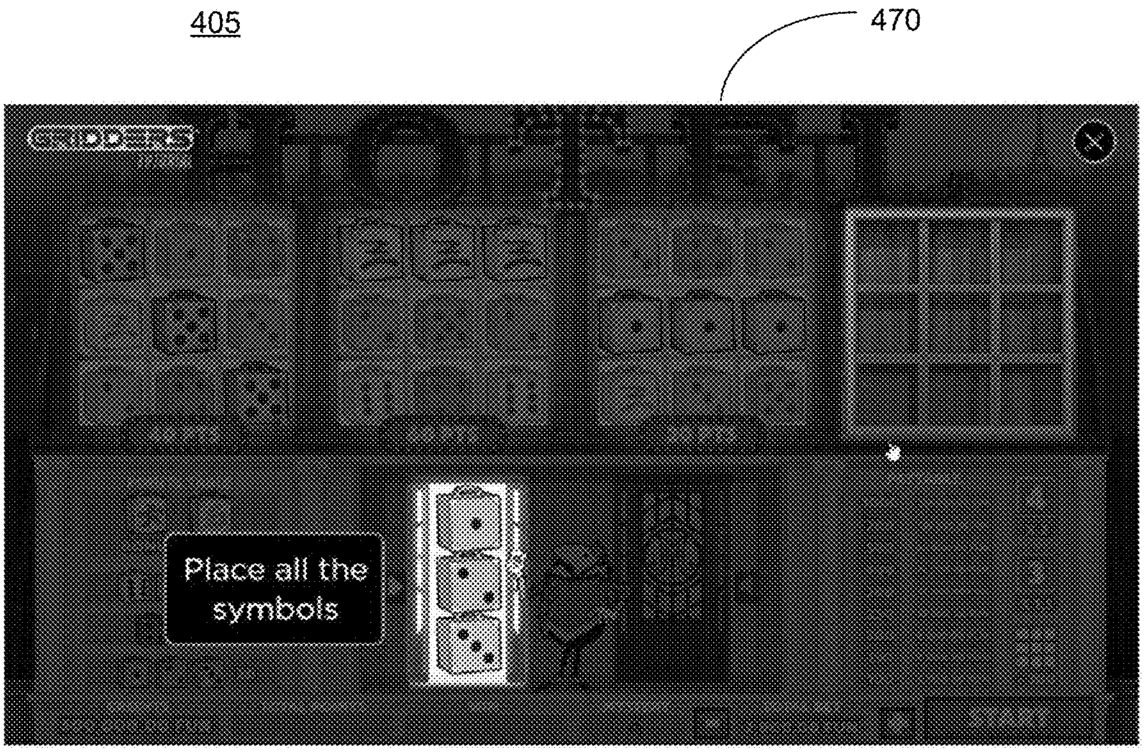
FIG. 4N illustrates the game interface displaying a twelfth tutorial screen for the slot game according to one or more aspects of the disclosed subject matter.

FIG. 4N illustrates the game interface 405 displaying a twelfth tutorial screen 470 for the slot game according to one or more aspects of the disclosed subject matter.

Figure 4O:
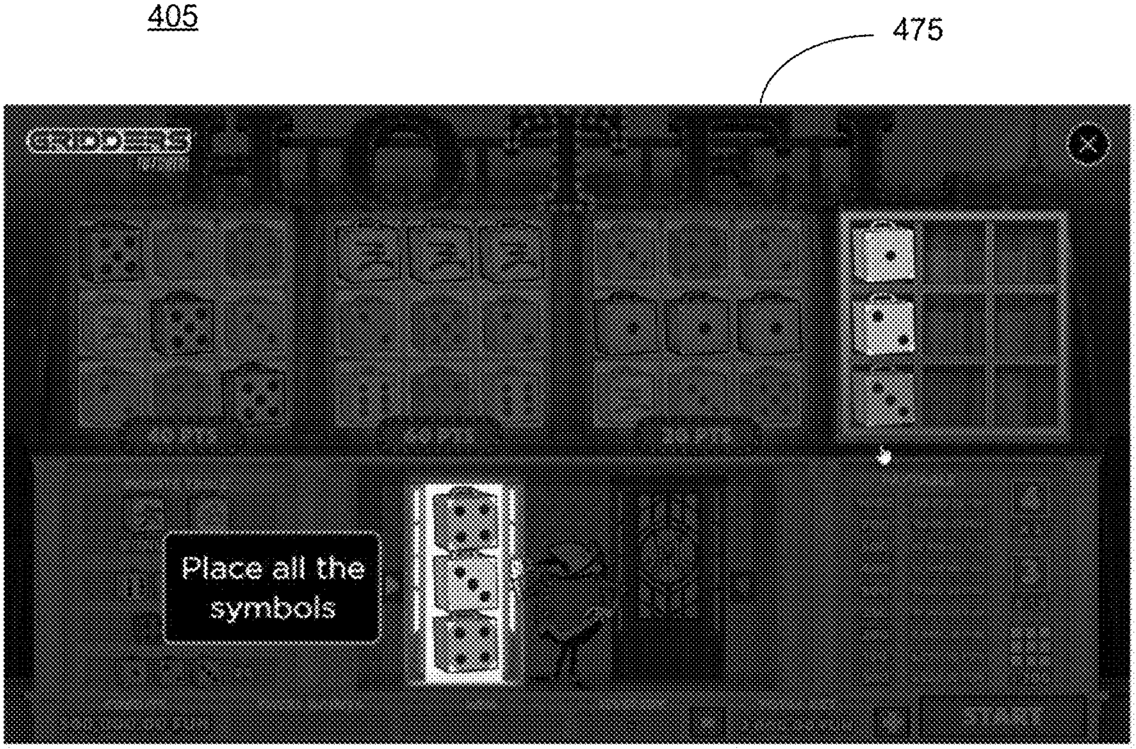
FIG. 4O illustrates the game interface displaying a thirteenth tutorial screen for the slot game according to one or more aspects of the disclosed subject matter.

FIG. 4O illustrates the game interface 405 displaying a thirteenth tutorial screen 475 for the slot game according to one or more aspects of the disclosed subject matter.

Figure 4P:
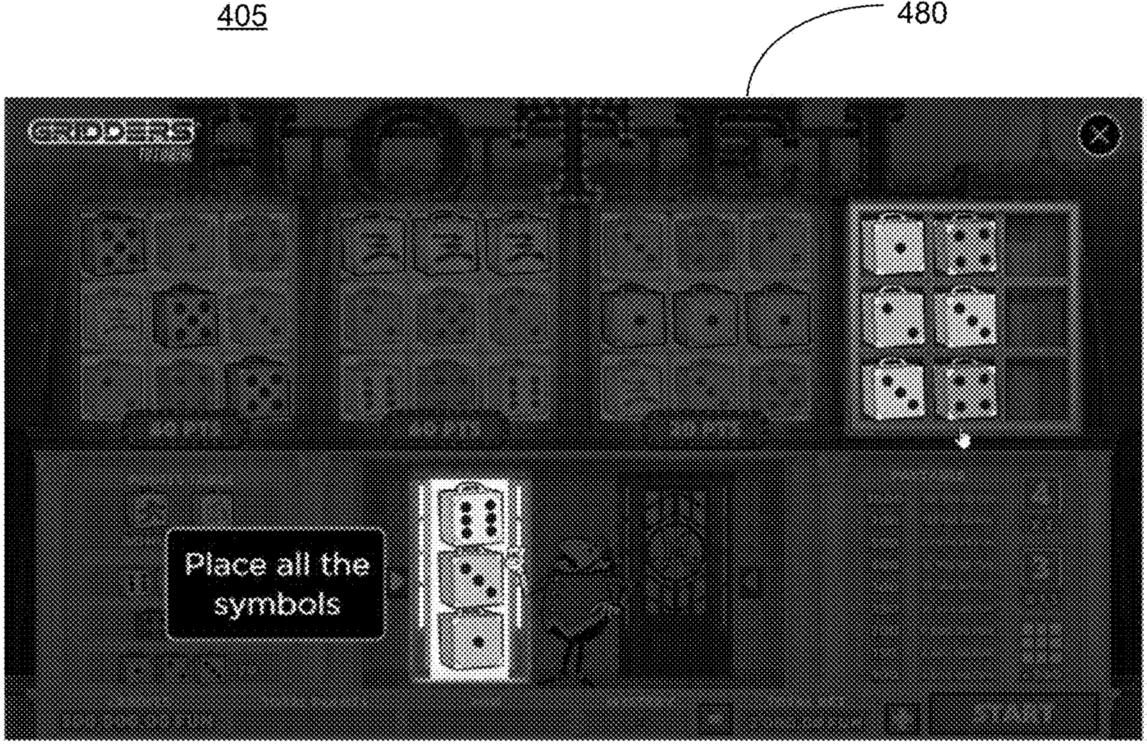
FIG. 4P illustrates the game interface displaying a fourteenth tutorial screen for the slot game according to one or more aspects of the disclosed subject matter.

FIG. 4P illustrates the game interface 405 displaying a fourteenth tutorial screen 480 for the slot game according to one or more aspects of the disclosed subject matter.

Figure 4Q:
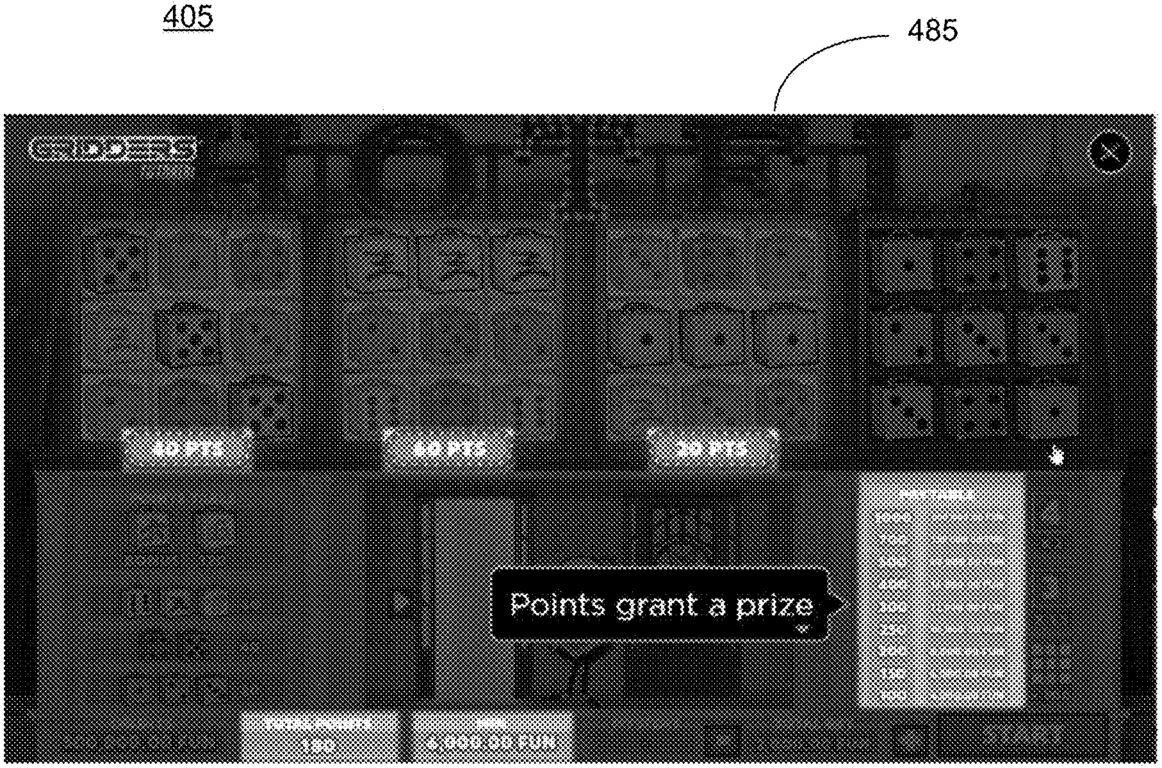
FIG. 4Q illustrates the game interface displaying a fifteenth tutorial screen for the slot game according to one or more aspects of the disclosed subject matter.

FIG. 4Q illustrates the game interface 405 displaying a fifteenth tutorial screen 485 for the slot game according to one or more aspects of the disclosed subject matter.

Figure 4R:
FIG. 4R illustrates the game interface displaying a sixteenth tutorial screen for the slot game according to one or more aspects of the disclosed subject matter.

FIG. 4R illustrates the game interface 405 displaying a sixteenth tutorial screen 490 for the slot game according to one or more aspects of the disclosed subject matter.

Figure 5A:
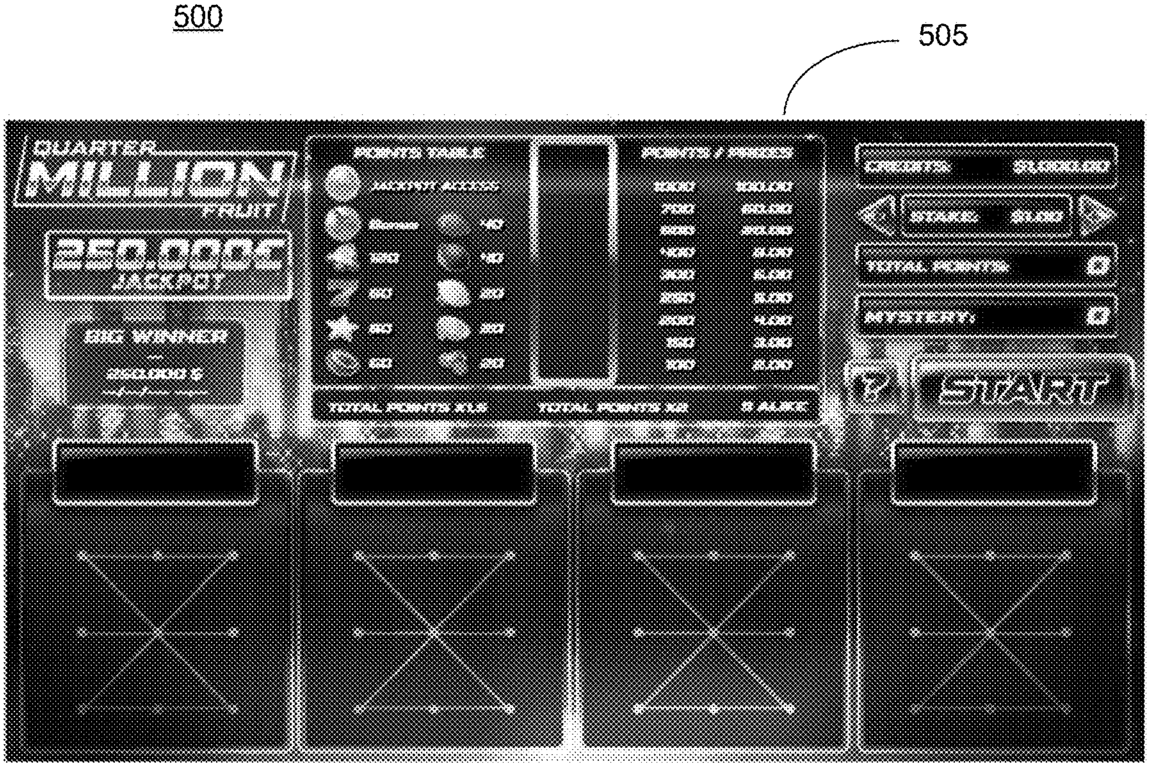
FIG. 5A illustrates a game interface displaying a start screen for a slot game according to one or more aspects of the disclosed subject matter.

FIG. 5A illustrates a game interface 500 displaying a start screen 505 for a slot game according to one or more aspects of the disclosed subject matter.

Figure 5B:
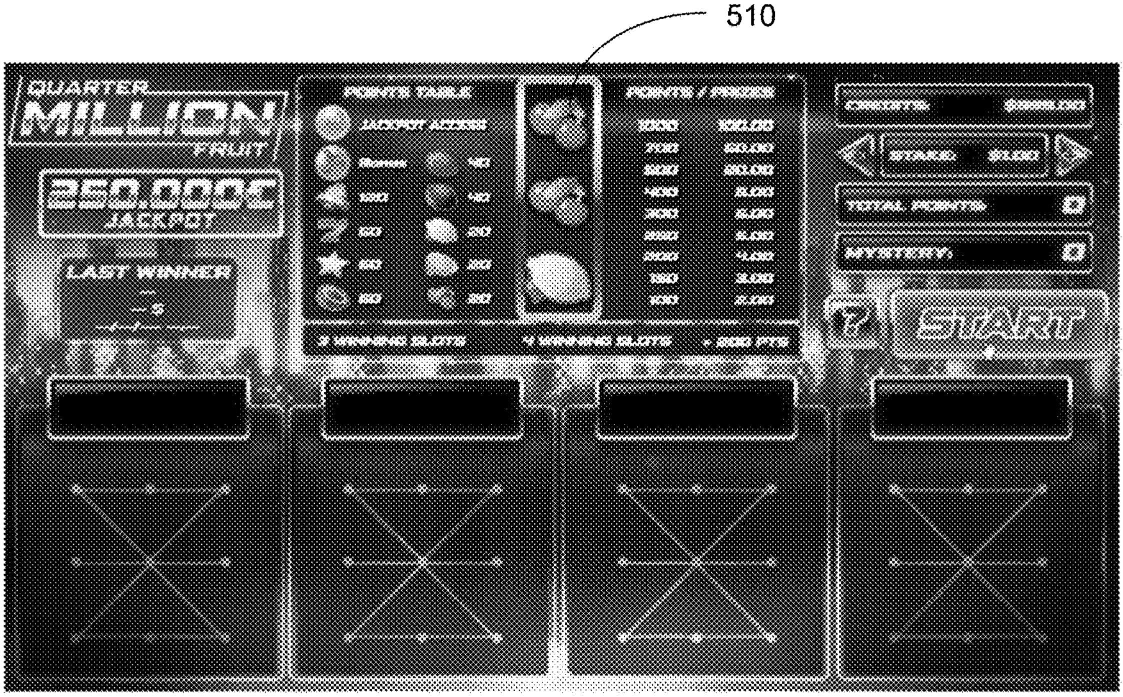
FIG. 5B illustrates a game interface displaying an exemplary first reel for the slot game according to one or more aspects of the disclosed subject matter.

FIG. 5B illustrates the game interface 500 displaying an exemplary first reel 510 for the slot game according to one or more aspects of the disclosed subject matter.

Figure 5C:
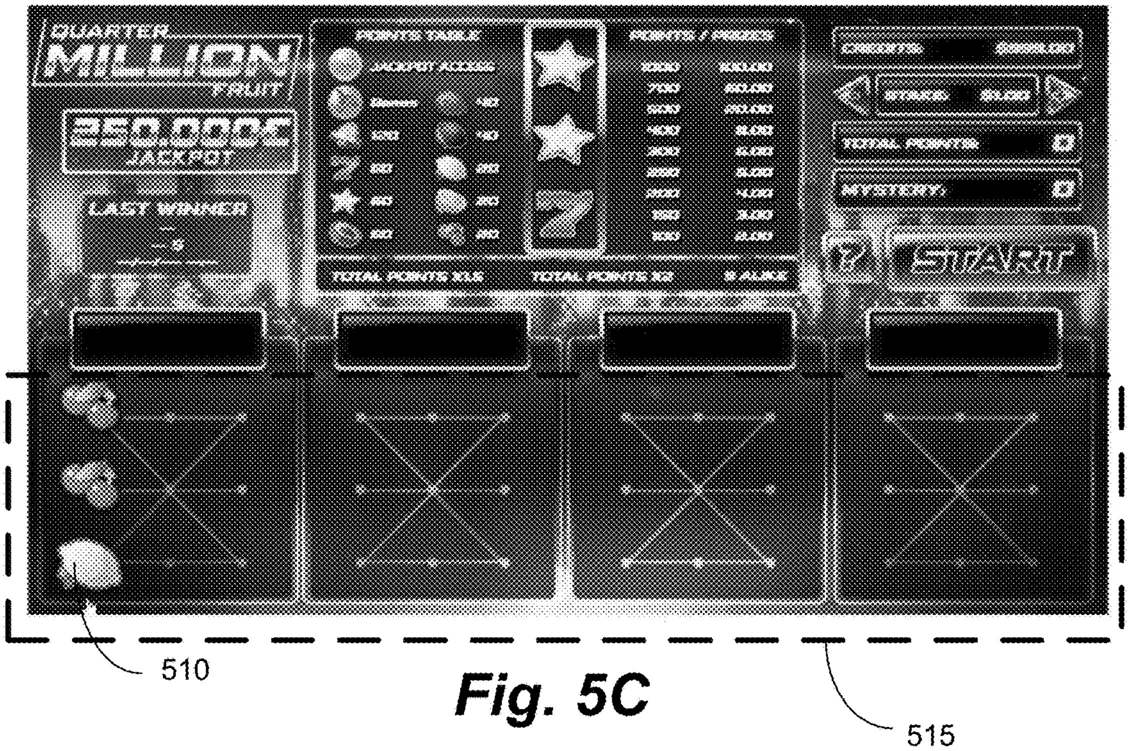
FIG. 5C illustrates a game interface displaying an exemplary placement of the first reel in one of a plurality of grids according to one or more aspects of the disclosed subject matter.

FIG. 5C illustrates the game interface displaying an exemplary placement of the first reel 510 in one of a plurality of grids 515 according to one or more aspects of the disclosed subject matter.

Figure 5D:
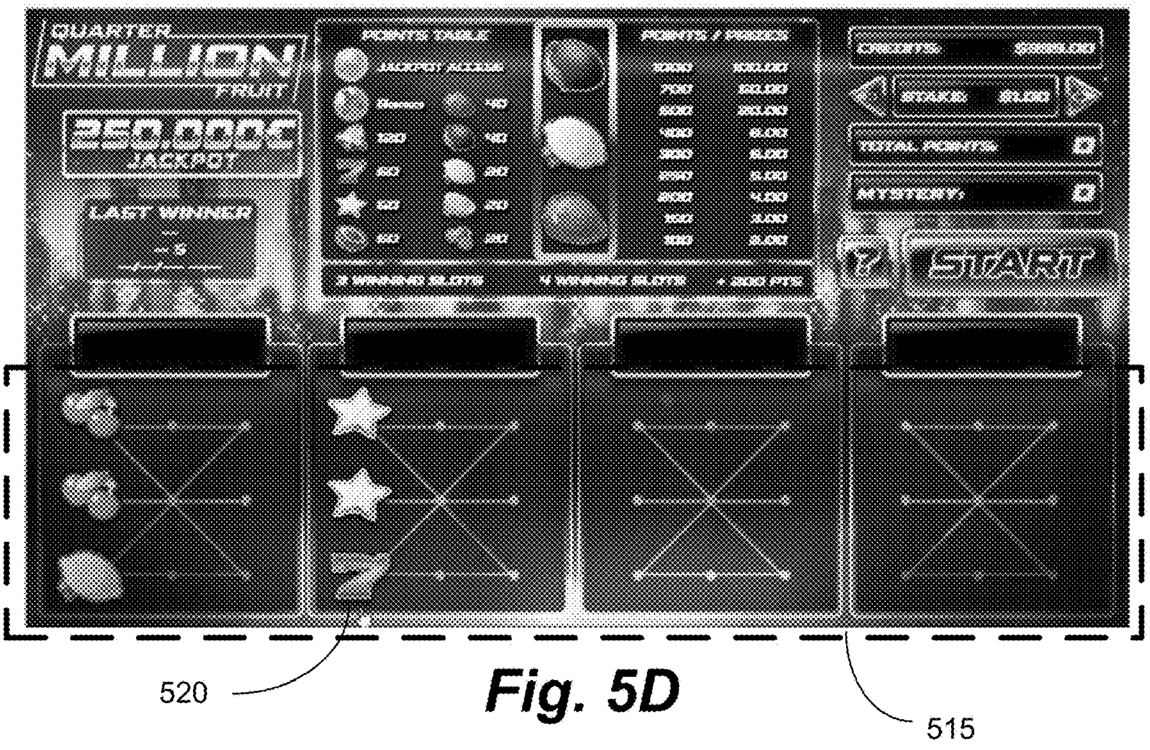
FIG. 5D illustrates a game interface displaying an exemplary placement of a second reel in one of a plurality of grids according to one or more aspects of the disclosed subject matter.

FIG. 5D illustrates the game interface 500 displaying an exemplary placement of a second reel 520 in one of the plurality of grids 515 according to one or more aspects of the disclosed subject matter.

Figure 5E:
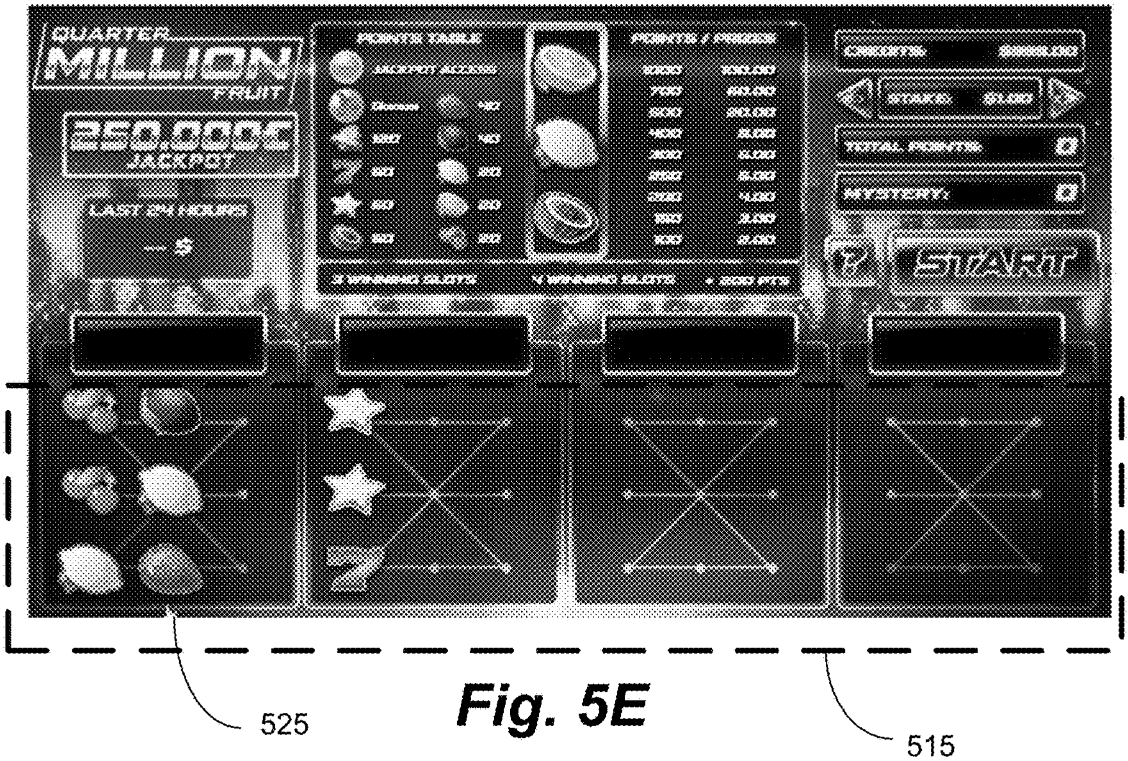
FIG. 5E illustrates a game interface displaying an exemplary placement of a third reel in one of a plurality of grids according to one or more aspects of the disclosed subject matter.

FIG. 5E illustrates the game interface 500 displaying an exemplary placement of a third reel 525 in one of the plurality of grids 515 according to one or more aspects of the disclosed subject matter.

Figure 5F:
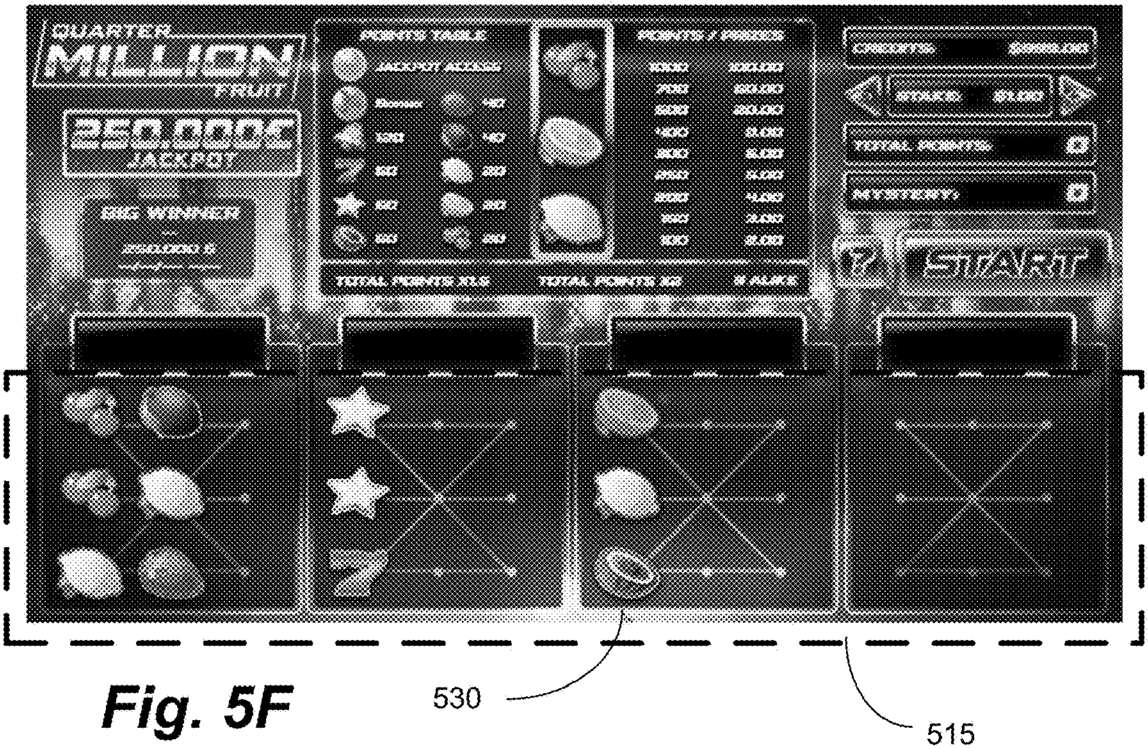
FIG. 5F illustrates a game interface displaying an exemplary placement of a fourth reel in one of a plurality of grids according to one or more aspects of the disclosed subject matter.

FIG. 5F illustrates the game interface 500 displaying an exemplary placement of a fourth reel 530 in one of the plurality of grids 515 according to one or more aspects of the disclosed subject matter.

Figure 5G:
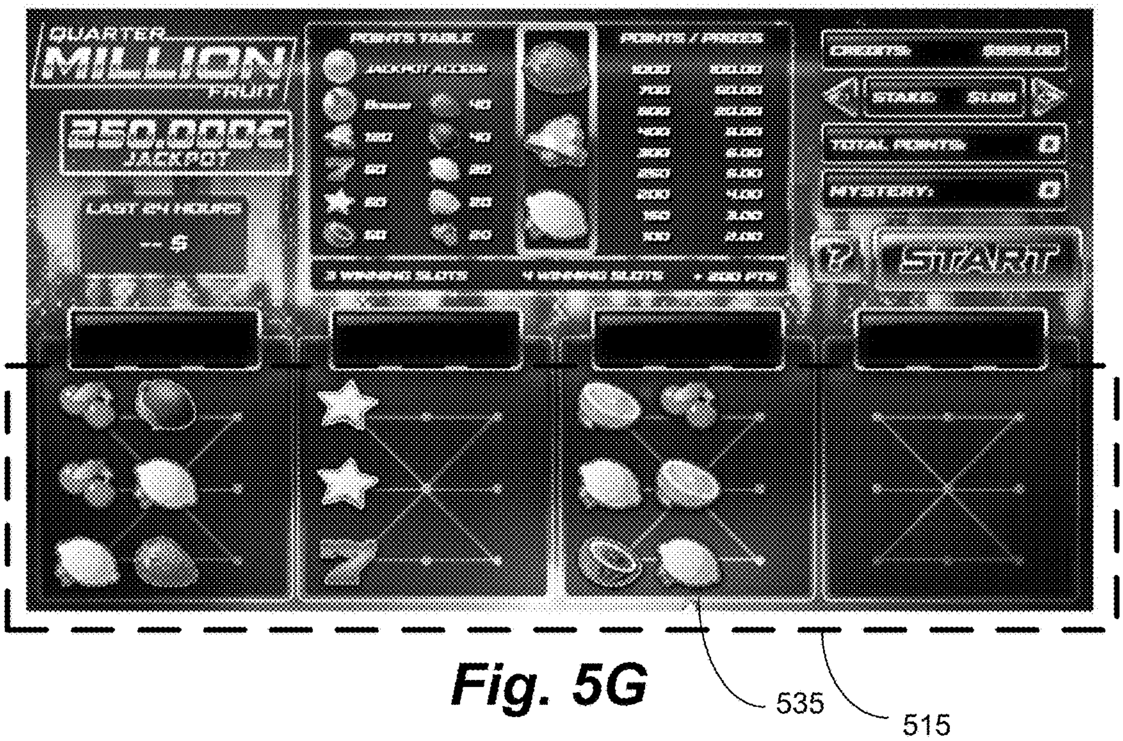
FIG. 5G illustrates a game interface displaying an exemplary placement of a fifth reel in one of a plurality of grids according to one or more aspects of the disclosed subject matter.

FIG. 5G illustrates the game interface 500 displaying an exemplary placement of a fifth reel 535 in one of the plurality of grids 515 according to one or more aspects of the disclosed subject matter.

Figure 5H:
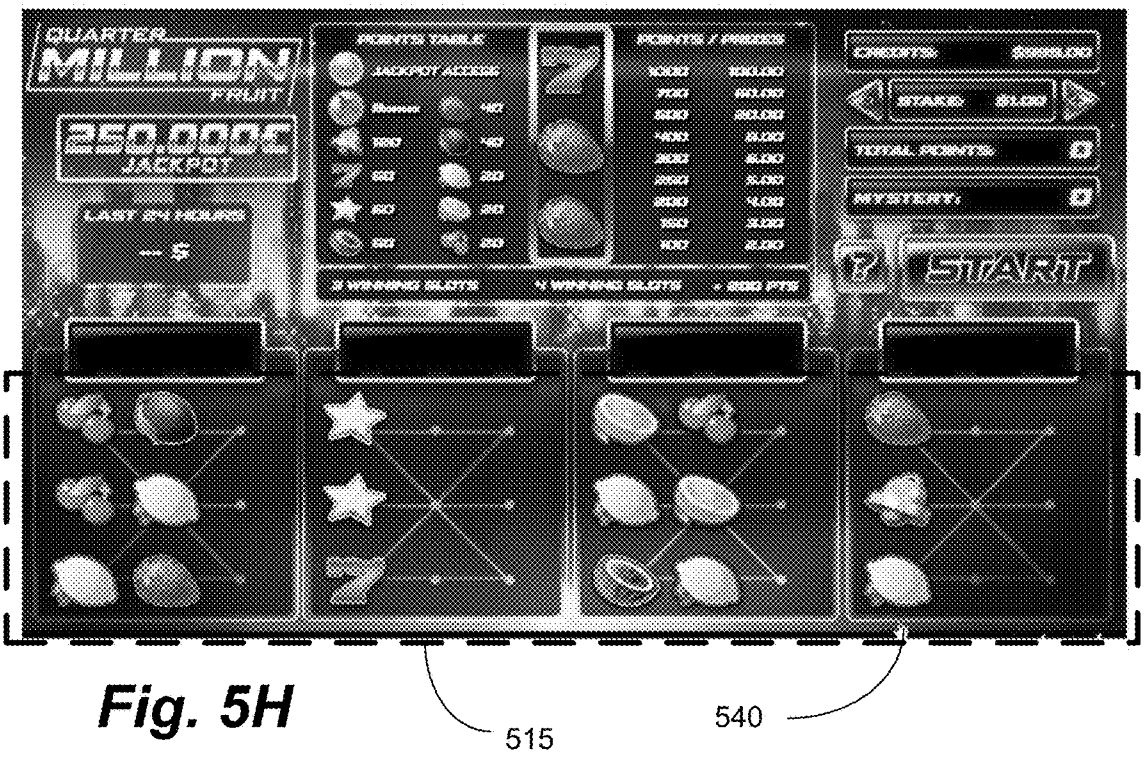
FIG. 5H illustrates a game interface displaying an exemplary placement of a sixth reel in one of a plurality of grids according to one or more aspects of the disclosed subject matter.

FIG. 5H illustrates the game interface 500 displaying an exemplary placement of a sixth reel 540 in one of the plurality of grids 515 according to one or more aspects of the disclosed subject matter.

Figure 5I:
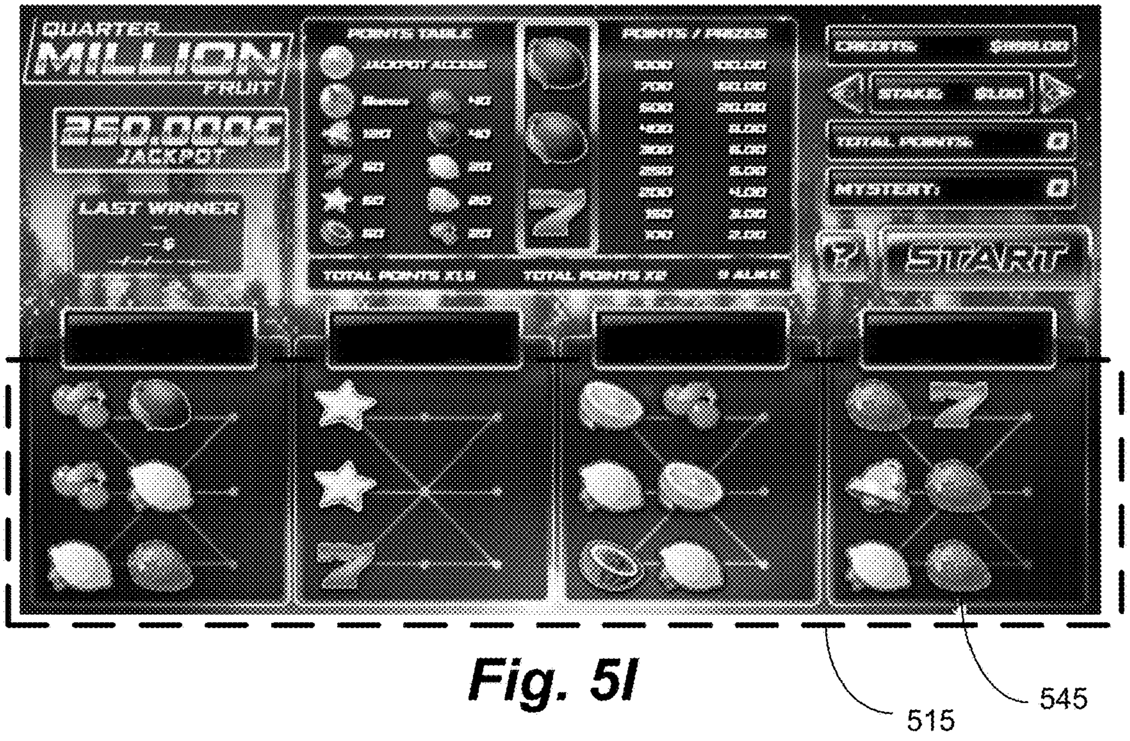
FIG. 5I illustrates a game interface displaying an exemplary placement of a seventh reel in one of a plurality of grids according to one or more aspects of the disclosed subject matter.

FIG. 5I illustrates the game interface 500 displaying an exemplary placement of a seventh reel 545 in one of the plurality of grids 515 according to one or more aspects of the disclosed subject matter.

Figure 5J:
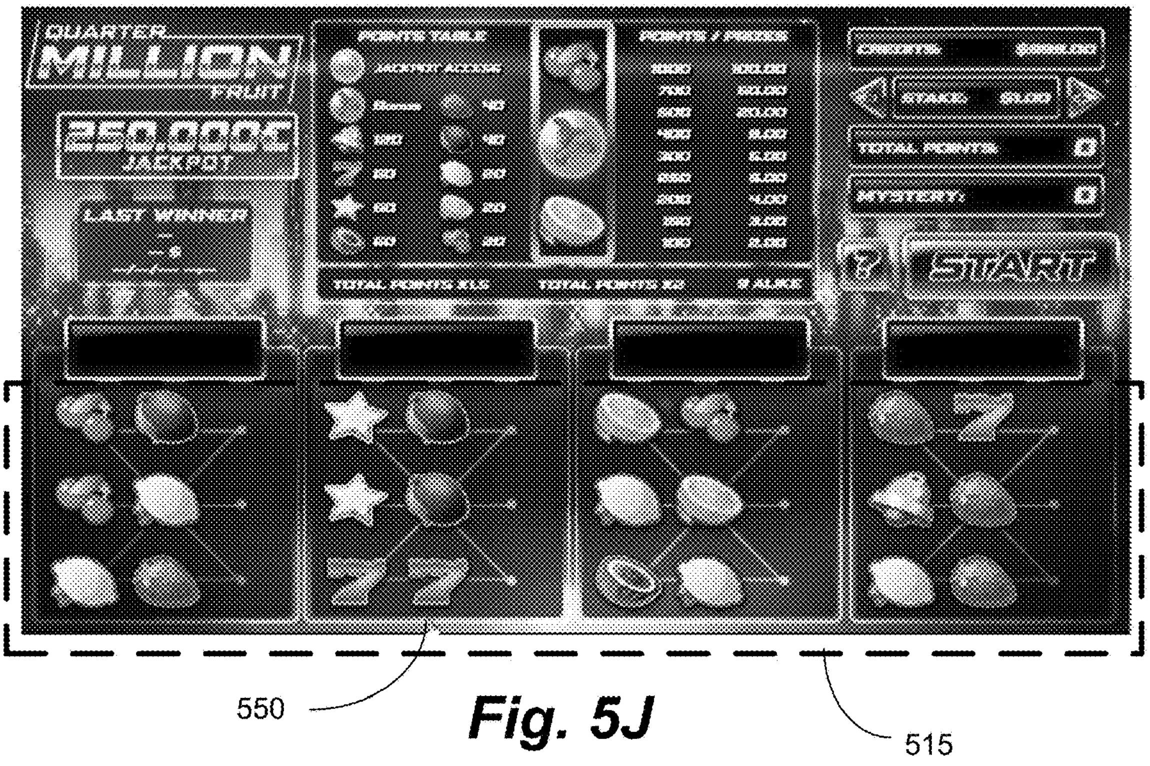
FIG. 5J illustrates a game interface displaying an exemplary placement of an eighth reel in one of a plurality of grids according to one or more aspects of the disclosed subject matter.

FIG. 5J illustrates the game interface 500 displaying an exemplary placement of an eighth reel 550 in one of the plurality of grids 515 according to one or more aspects of the disclosed subject matter.

Figure 5K:
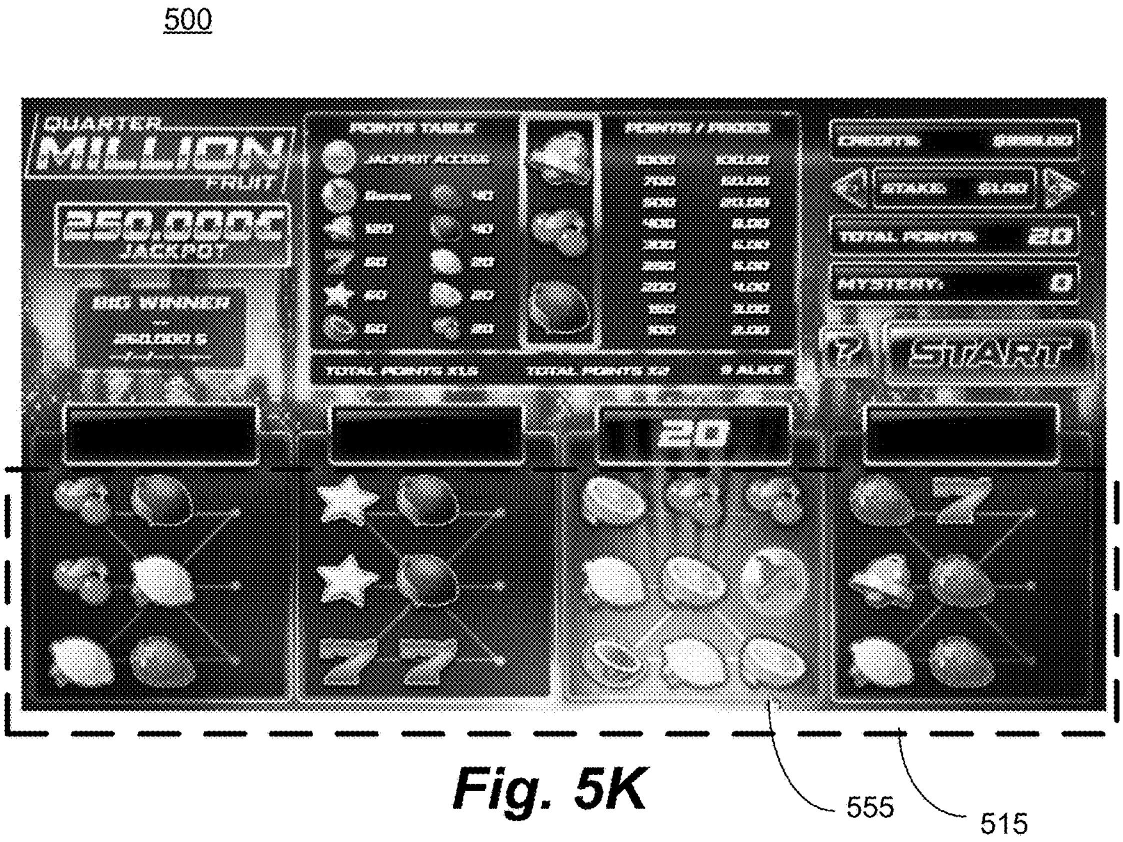
FIG. 5K illustrates a game interface displaying an exemplary placement of a ninth reel in one of a plurality of grids according to one or more aspects of the disclosed subject matter.

FIG. 5K illustrates the game interface 500 displaying an exemplary placement of a ninth reel 555 in one of the plurality of grids 515 according to one or more aspects of the disclosed subject matter.

Figure 5L:
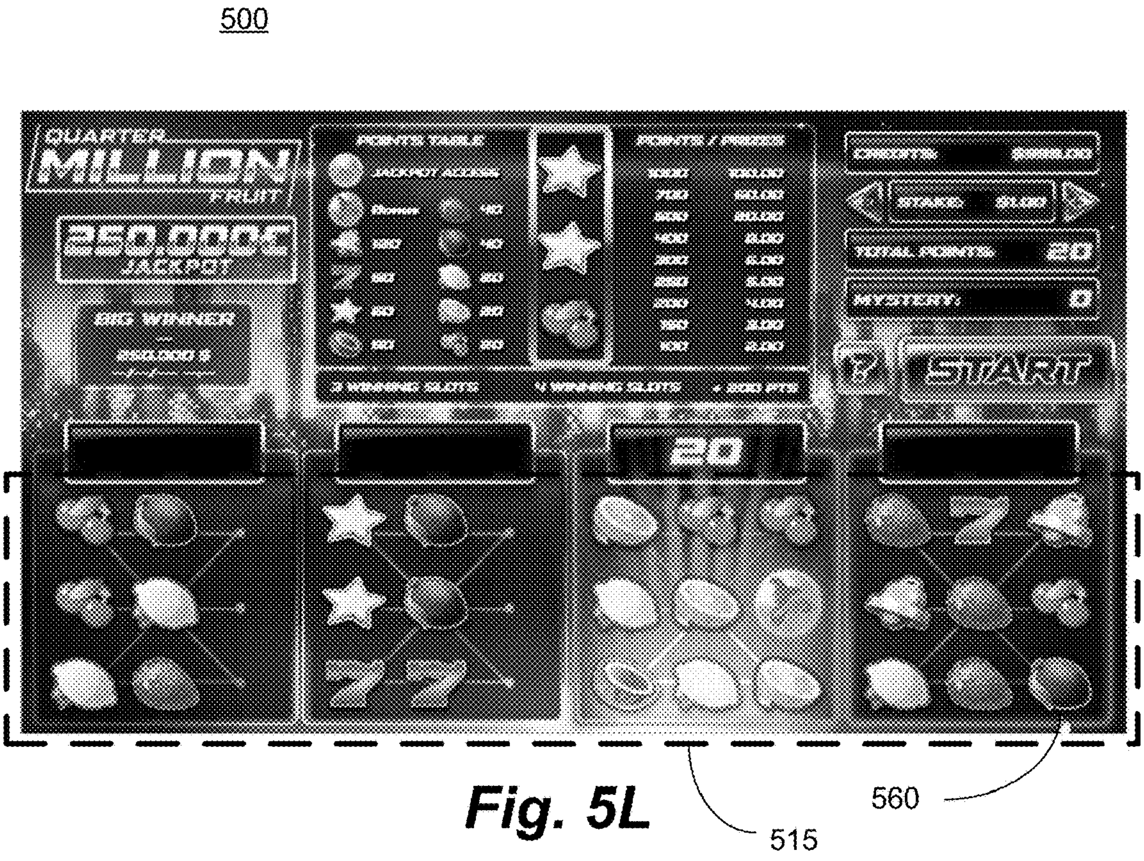
FIG. 5L illustrates a game interface displaying an exemplary placement of a tenth reel in one of a plurality of grids according to one or more aspects of the disclosed subject matter.

FIG. 5L illustrates the game interface 500 displaying an exemplary placement of a tenth reel 560 in one of the plurality of grids 515 according to one or more aspects of the disclosed subject matter.

Figure 5M:
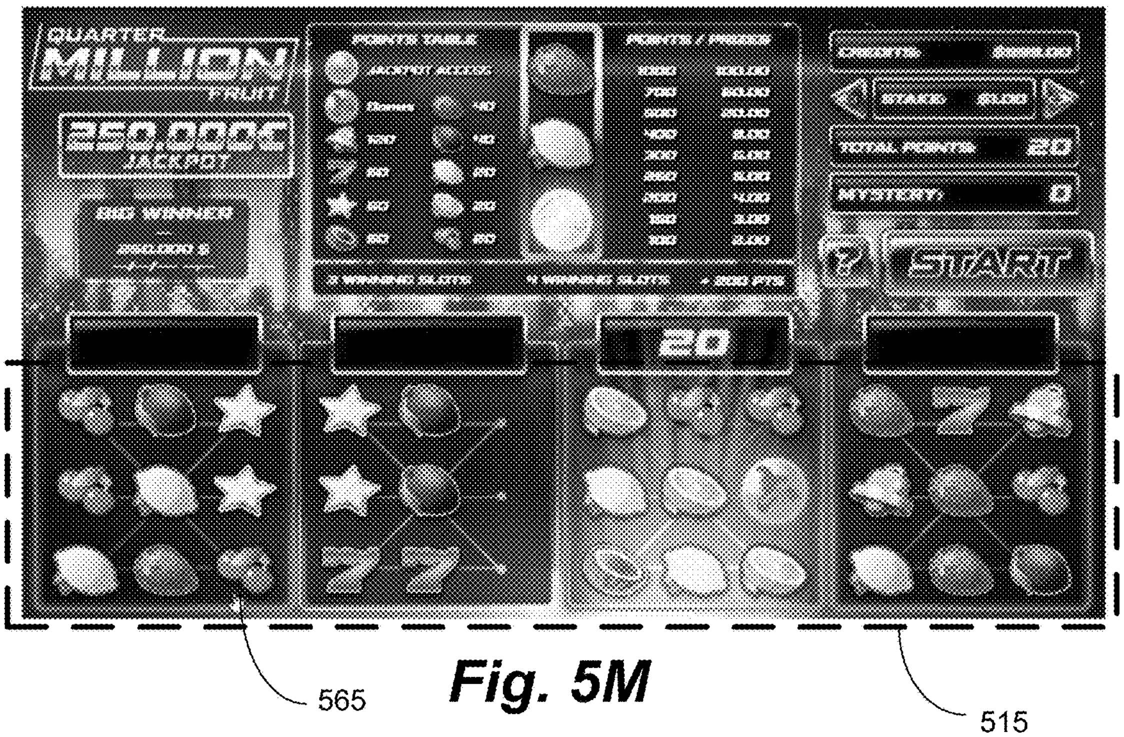
FIG. 5M illustrates a game interface displaying an exemplary placement of an eleventh reel in one of a plurality of grids according to one or more aspects of the disclosed subject matter.

FIG. 5M illustrates the game interface 500 displaying an exemplary placement of an eleventh reel 565 in one of the plurality of grids 515 according to one or more aspects of the disclosed subject matter.

Figure 5N:
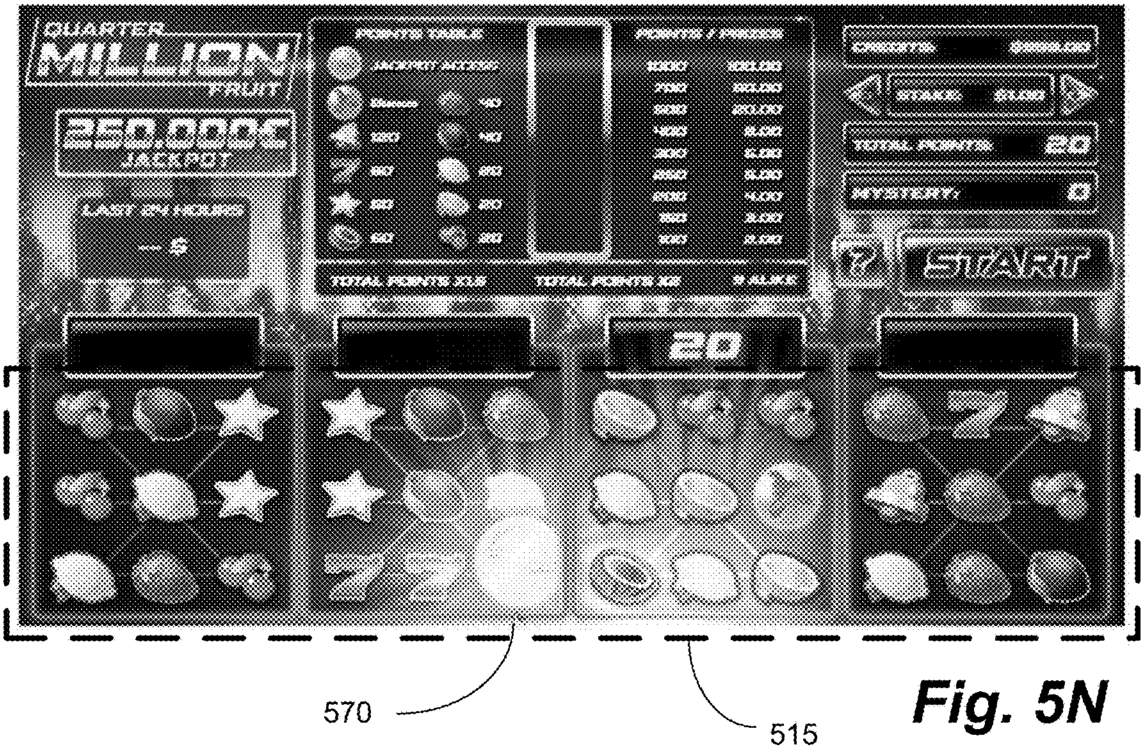
FIG. 5N illustrates a game interface displaying an exemplary placement of a twelfth reel in one of a plurality of grids according to one or more aspects of the disclosed subject matter.

FIG. 5N illustrates the game interface 500 displaying an exemplary placement of a twelfth reel 570 in one of the plurality of grids 515 according to one or more aspects of the disclosed subject matter.

Figure 5O:
FIG. 5O illustrates a game interface displaying a "play again" screen according to one or more aspects of the disclosed subject matter.

FIG. 5O illustrates the game interface 500 displaying a "play again" screen 580 according to one or more aspects of the disclosed subject matter.

Referring to FIGS. 5A-5O, an exemplary slot game is illustrated. In one aspect, the game interface 500 can be an example of the game interface 5 in FIG. 1 and the slot game can be played using a slot game system (e.g., slot game system 100) using the slot game mechanics described in FIGS. 1-3.

Figure 6A:
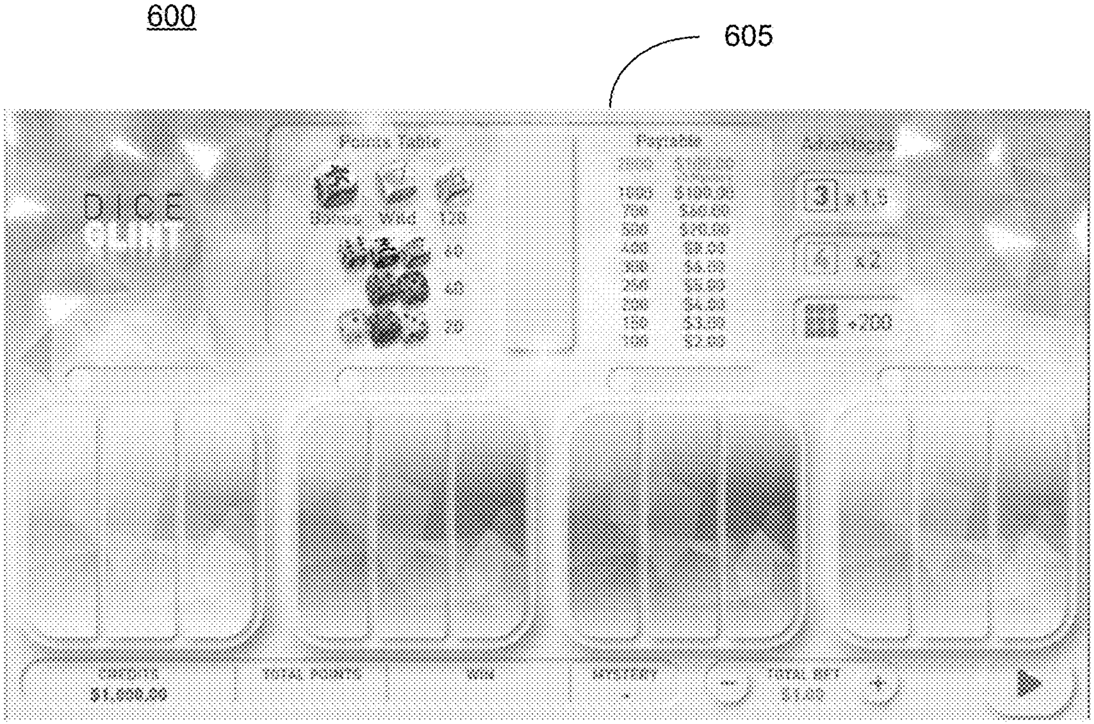
FIG. 6A illustrates a game interface displaying a start screen for a slot game according to one or more aspects of the disclosed subject matter.

FIG. 6A illustrates a game interface 600 displaying a start screen 605 for a slot game according to one or more aspects of the disclosed subject matter.

Figure 6B:
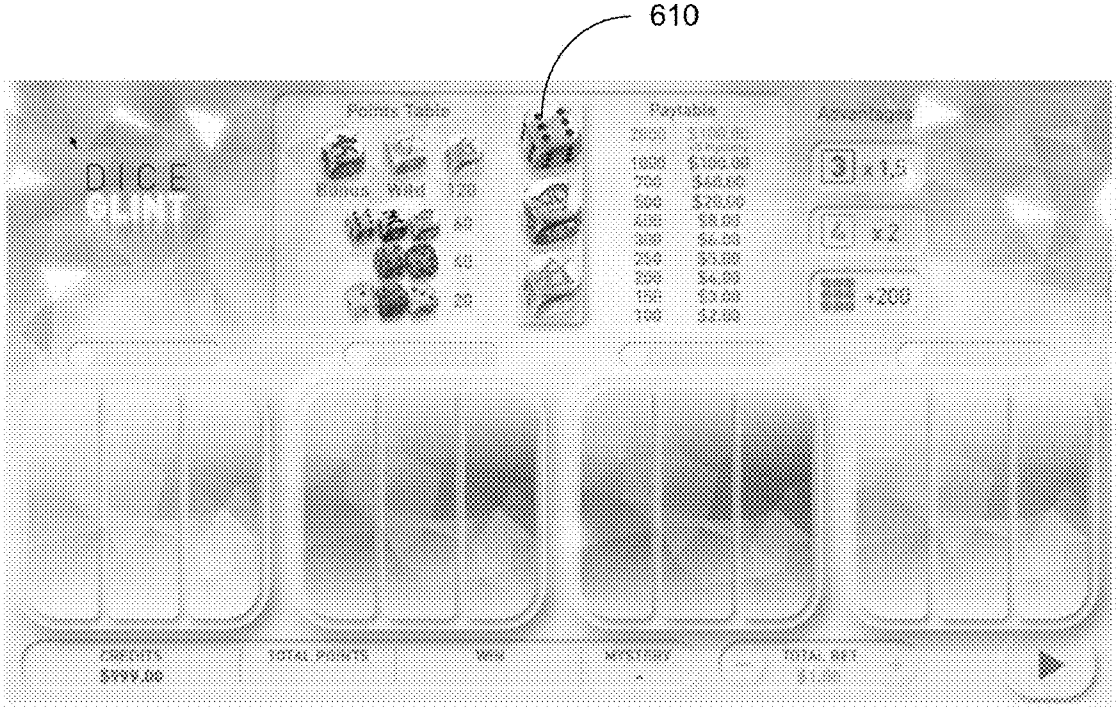
FIG. 6B illustrates a game interface displaying an exemplary first reel for the slot game according to one or more aspects of the disclosed subject matter.

FIG. 6B illustrates the game interface 600 displaying an exemplary first reel 610 for the slot game according to one or more aspects of the disclosed subject matter.

Figure 6C:
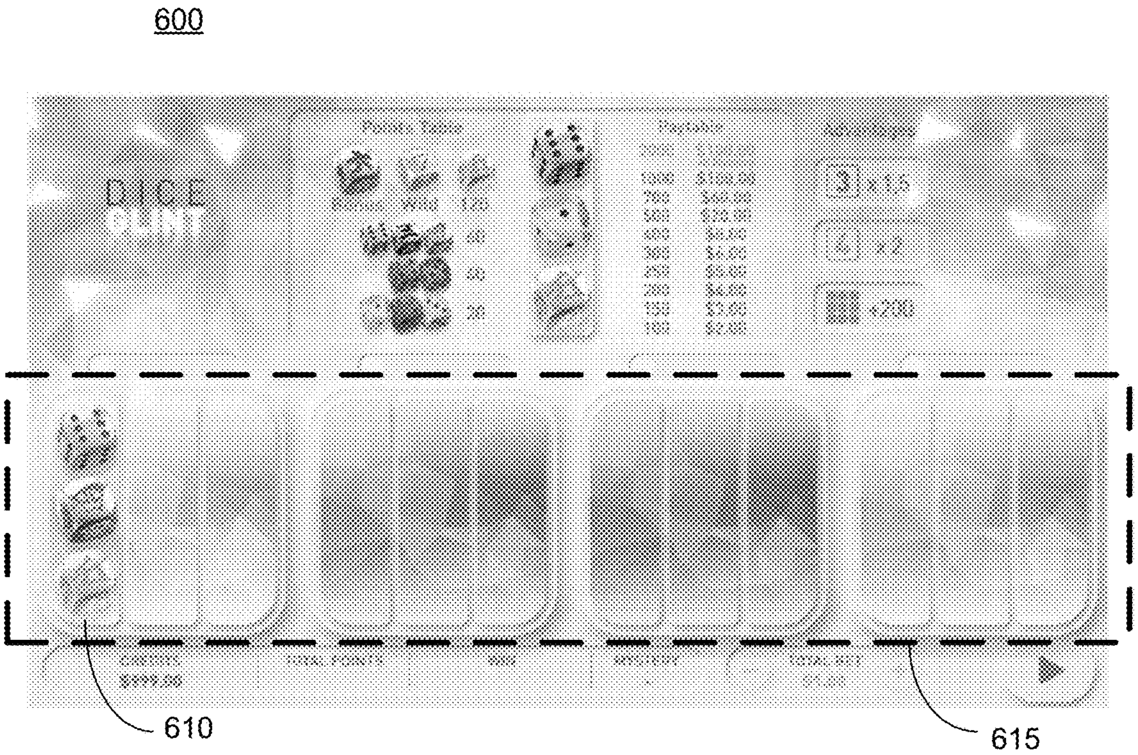
FIG. 6C illustrates a game interface displaying an exemplary placement of the first reel in one of a plurality of grids according to one or more aspects of the disclosed subject matter.

FIG. 6C illustrates the game interface 600 displaying an exemplary placement of the first reel 610 in one of a plurality of grids 615 according to one or more aspects of the disclosed subject matter.

Figure 6D:
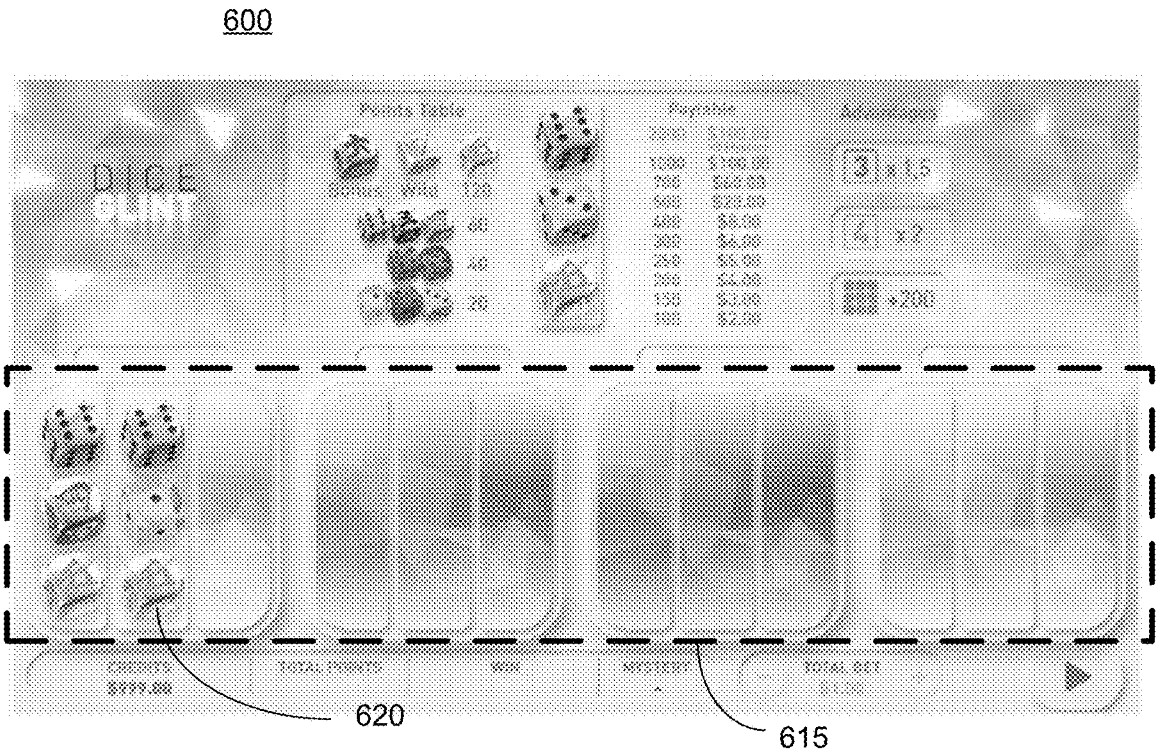
FIG. 6D illustrates a game interface displaying an exemplary placement of a second reel in one of a plurality of grids according to one or more aspects of the disclosed subject matter.

FIG. 6D illustrates the game interface 600 displaying an exemplary placement of a second reel 620 in one of the plurality of grids 615 according to one or more aspects of the disclosed subject matter.

Figure 6E:
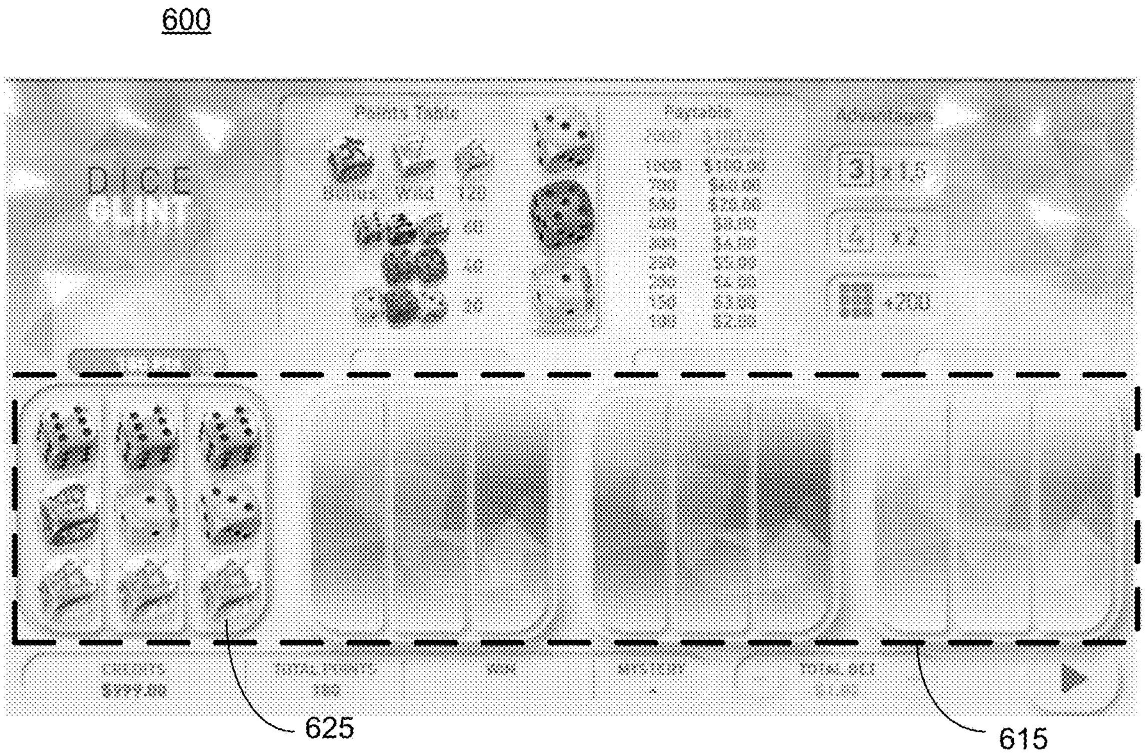
FIG. 6E illustrates a game interface displaying an exemplary placement of a third reel in one of a plurality of grids according to one or more aspects of the disclosed subject matter.

FIG. 6E illustrates the game interface 600 displaying an exemplary placement of a third reel 625 in one of the plurality of grids 615 according to one or more aspects of the disclosed subject matter.

Figure 6F:
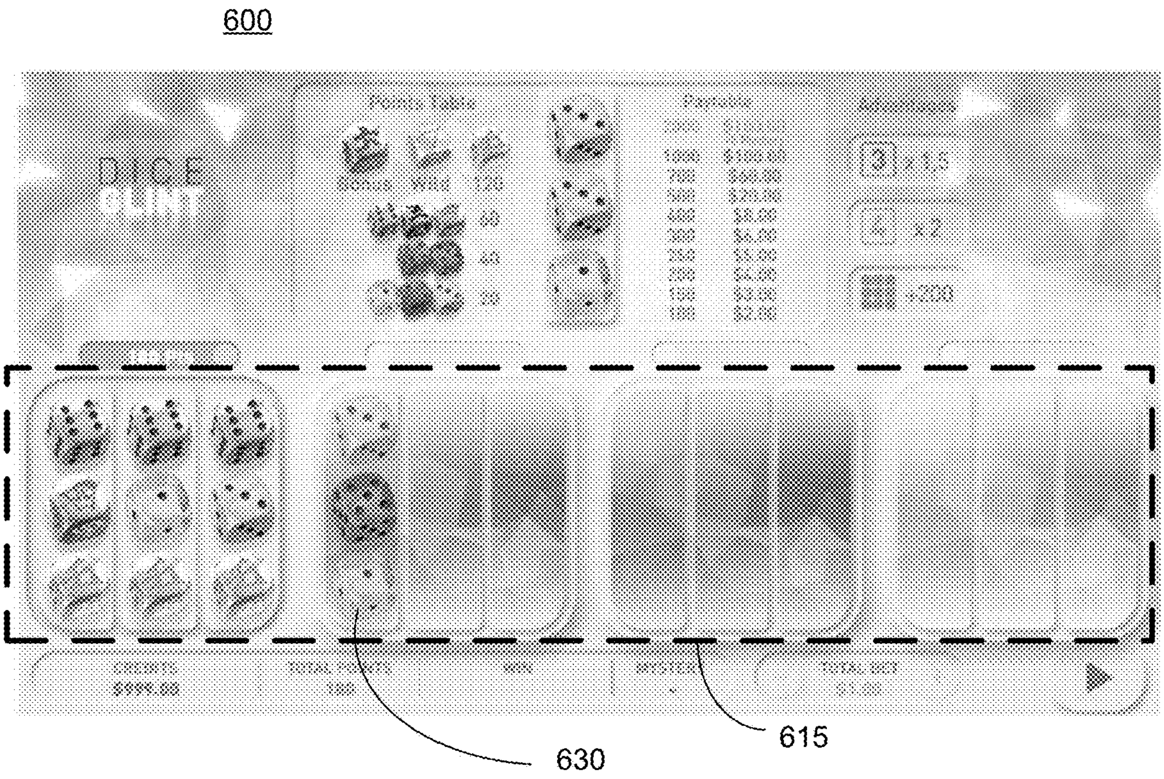
FIG. 6F illustrates a game interface displaying an exemplary placement of a fourth reel in one of a plurality of grids according to one or more aspects of the disclosed subject matter.

FIG. 6F illustrates the game interface 600 displaying an exemplary placement of a fourth reel 630 in one of the plurality of grids 615 according to one or more aspects of the disclosed subject matter.

Figure 6G:
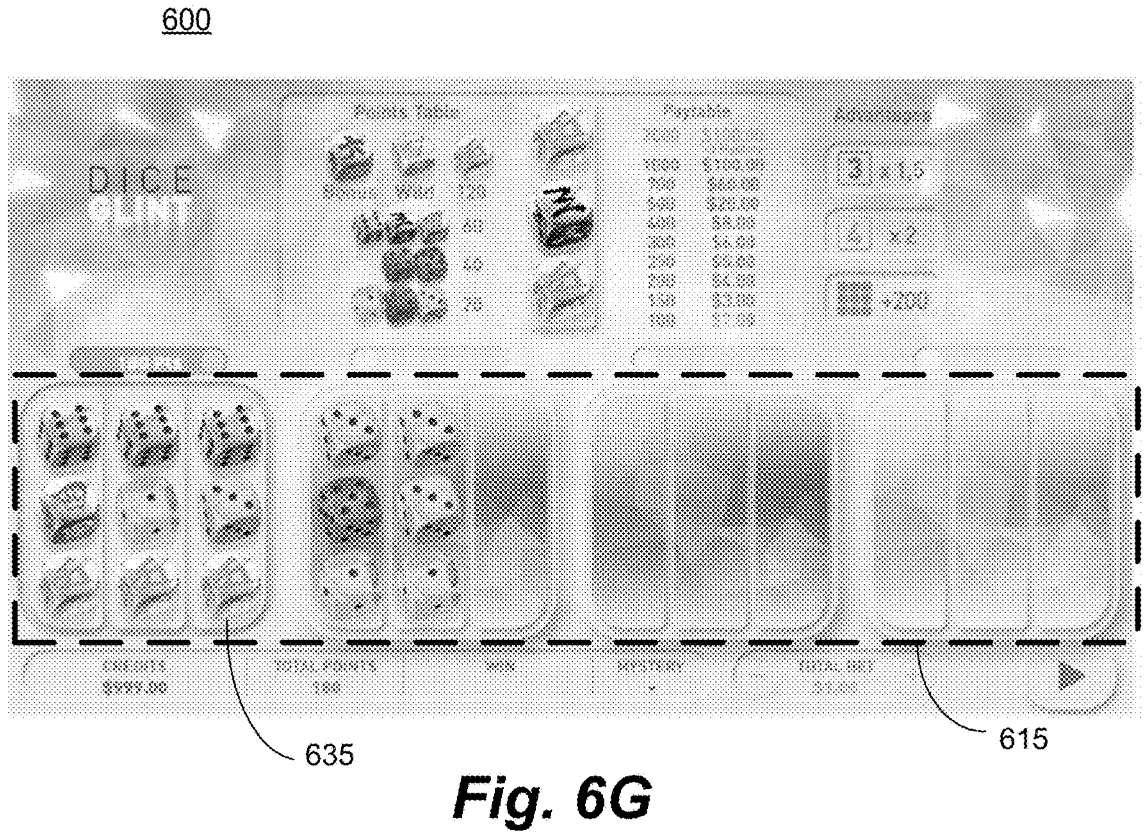
FIG. 6G illustrates a game interface displaying an exemplary placement of a fifth reel in one of a plurality of grids according to one or more aspects of the disclosed subject matter.

FIG. 6G illustrates the game interface 600 displaying an exemplary placement of a fifth reel 635 in one of the plurality of grids 615 according to one or more aspects of the disclosed subject matter.

Figure 6H:
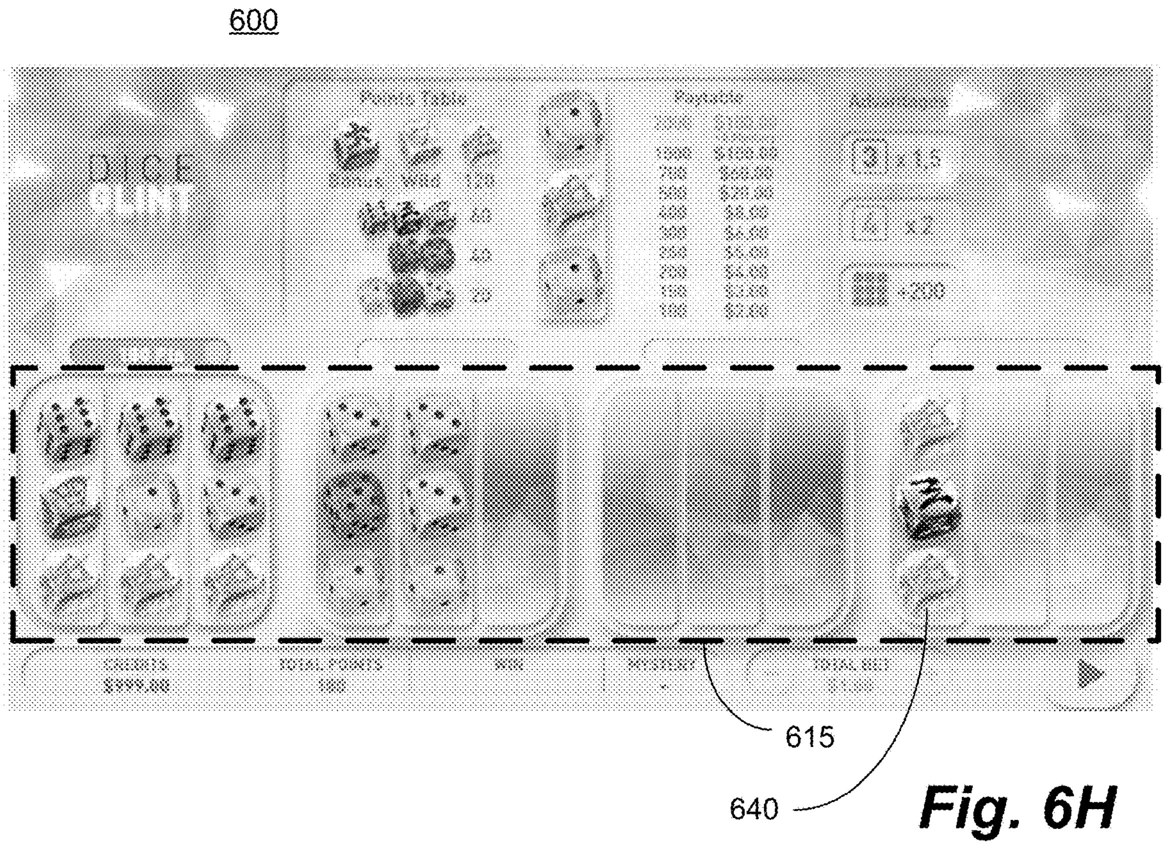
FIG. 6H illustrates a game interface displaying an exemplary placement of a sixth reel in one of a plurality of grids according to one or more aspects of the disclosed subject matter.

FIG. 6H illustrates the game interface 600 displaying an exemplary placement of a sixth reel 640 in one of the plurality of grids 615 according to one or more aspects of the disclosed subject matter.

Figure 6I:
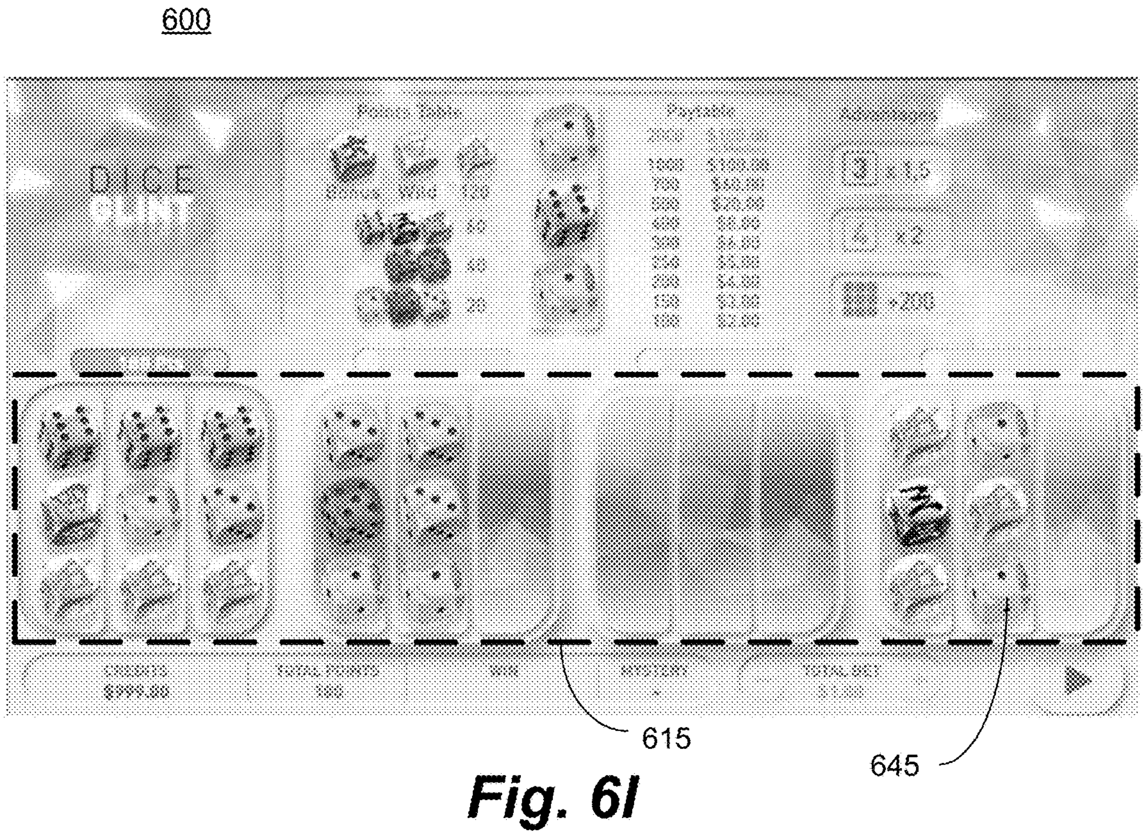
FIG. 6I illustrates a game interface displaying an exemplary placement of a seventh reel in one of a plurality of grids according to one or more aspects of the disclosed subject matter.

FIG. 6I illustrates the game interface 600 displaying an exemplary placement of a seventh reel 645 in one of the plurality of grids 615 according to one or more aspects of the disclosed subject matter.

Figure 6J:
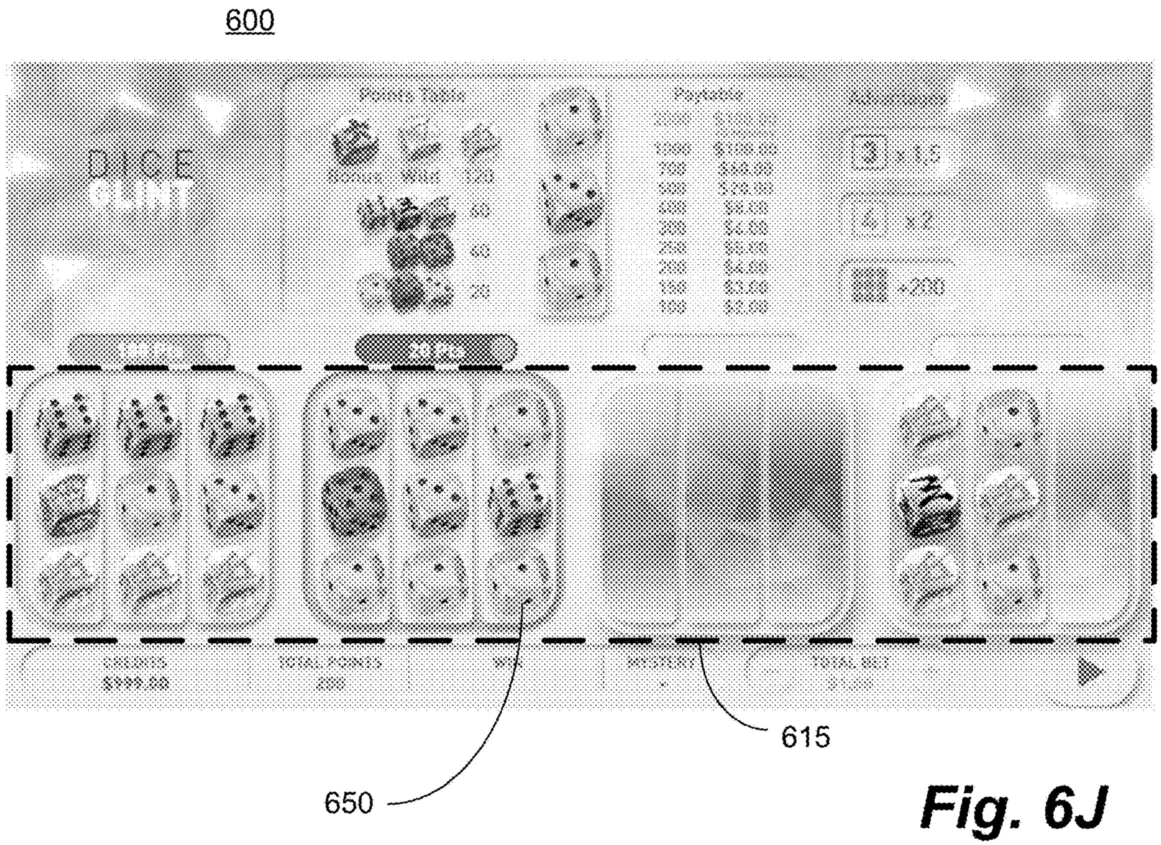
FIG. 6J illustrates a game interface displaying an exemplary placement of an eighth reel in one of a plurality of grids according to one or more aspects of the disclosed subject matter.

FIG. 6J illustrates the game interface 600 displaying an exemplary placement of an eighth reel 650 in one of the plurality of grids 615 according to one or more aspects of the disclosed subject matter.

Figure 6K:
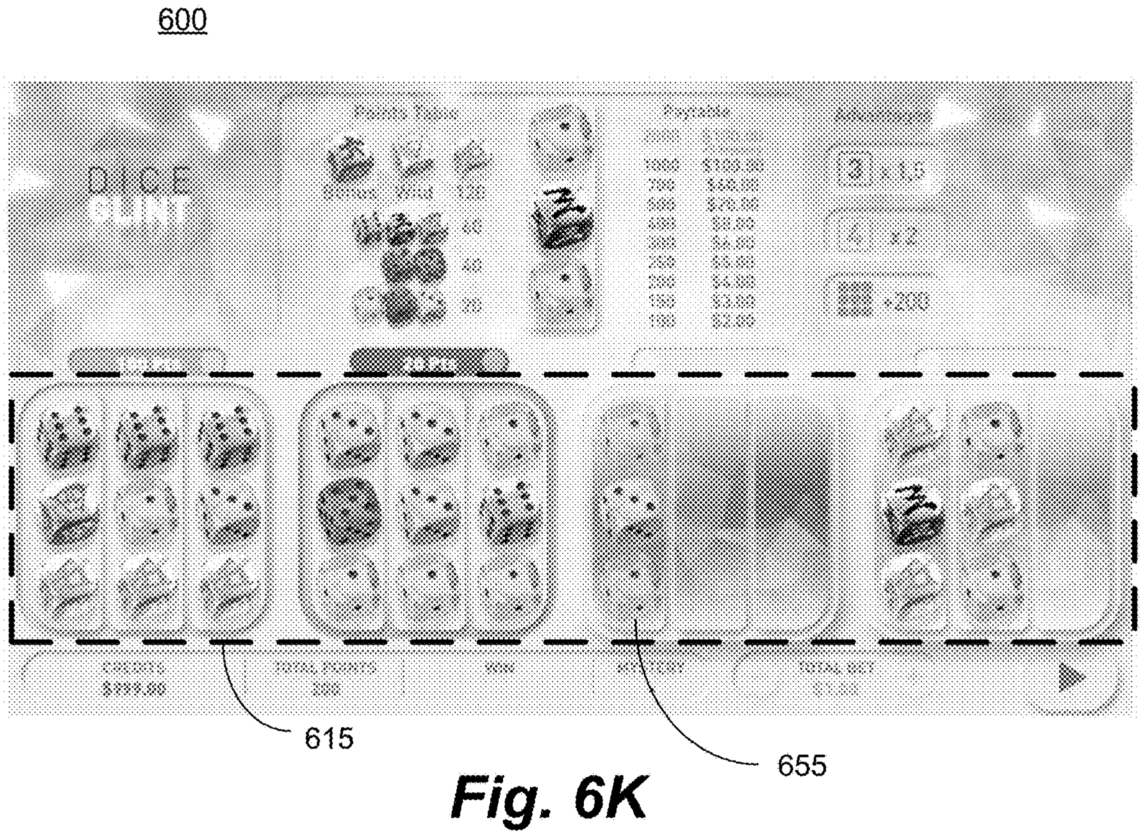
FIG. 6K illustrates a game interface displaying an exemplary placement of a ninth reel in one of a plurality of grids according to one or more aspects of the disclosed subject matter.

FIG. 6K illustrates the game interface 600 displaying an exemplary placement of a ninth reel 655 in one of the plurality of grids 615 according to one or more aspects of the disclosed subject matter.

Figure 6L:
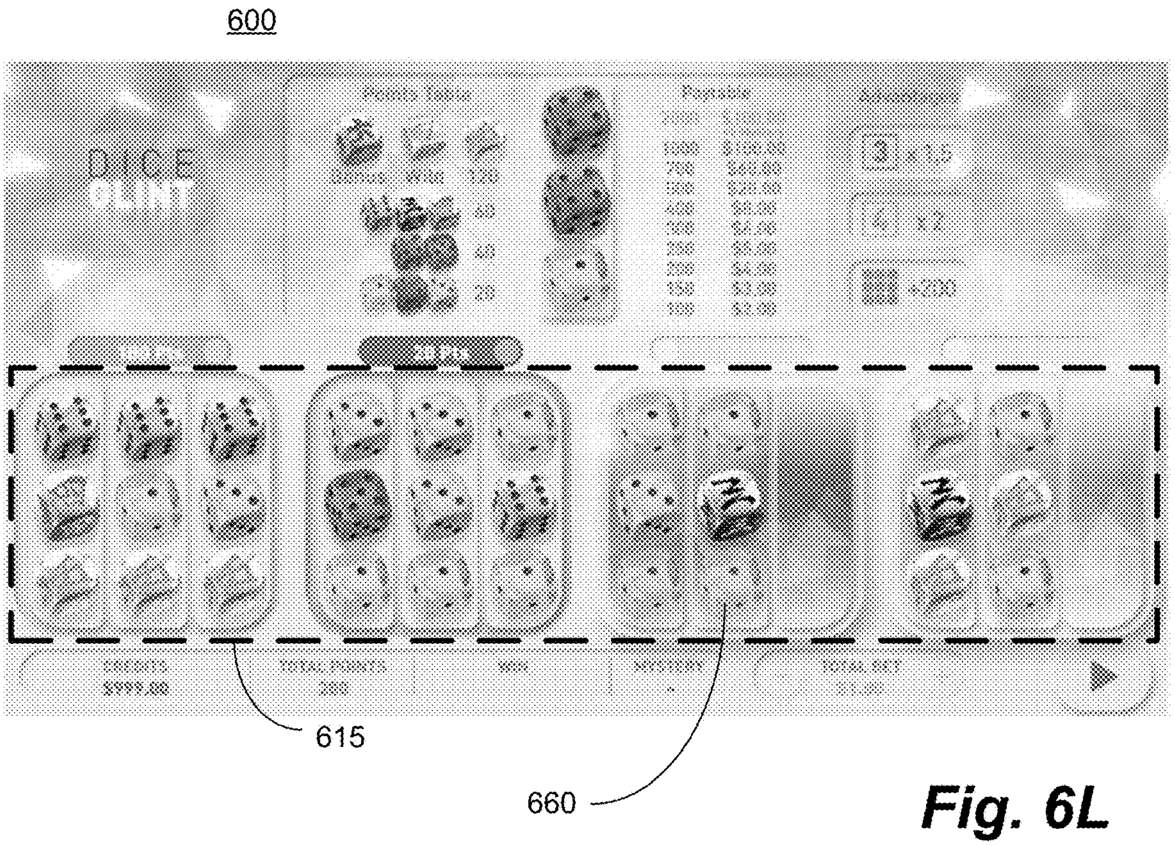
FIG. 6L illustrates a game interface displaying an exemplary placement of a tenth reel in one of a plurality of grids according to one or more aspects of the disclosed subject matter.

FIG. 6L illustrates the game interface 600 displaying an exemplary placement of a tenth reel 660 in one of the plurality of grids 615 according to one or more aspects of the disclosed subject matter.

Figure 6M:
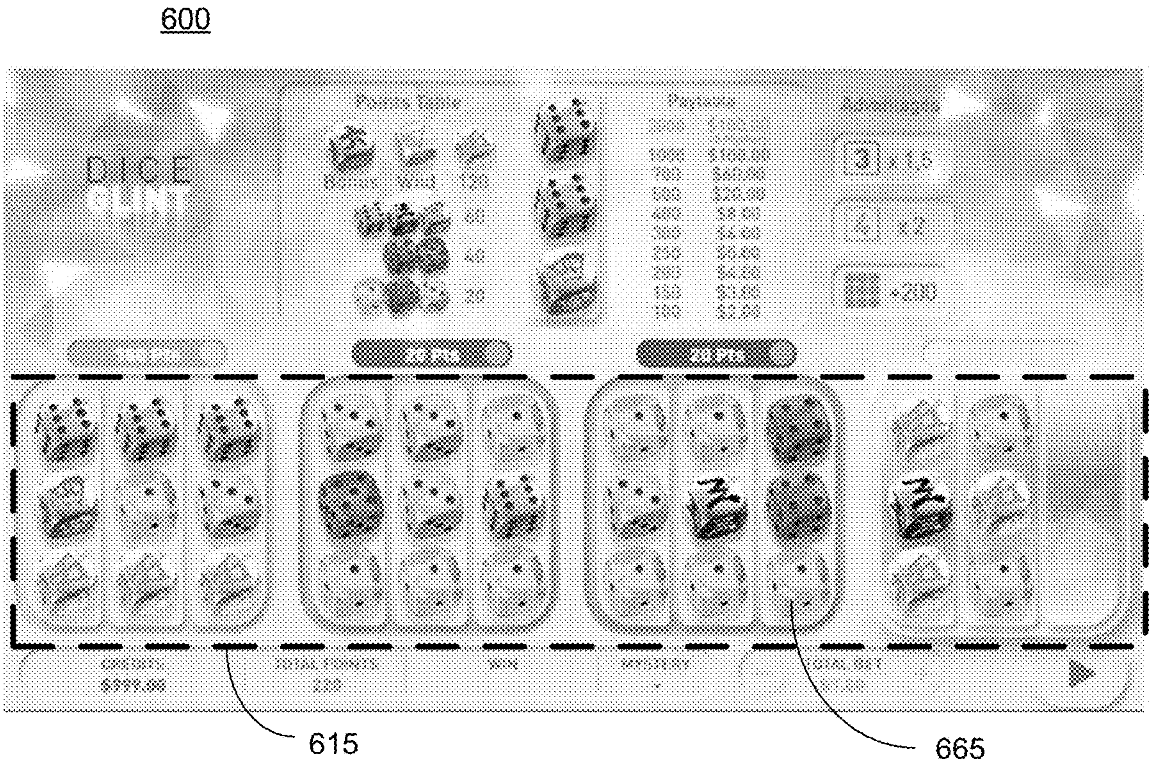
FIG. 6M illustrates a game interface displaying an exemplary placement of an eleventh reel in one of a plurality of grids according to one or more aspects of the disclosed subject matter.

FIG. 6M illustrates the game interface 600 displaying an exemplary placement of an eleventh reel 665 in one of the plurality of grids 615 according to one or more aspects of the disclosed subject matter.

Figure 6N:
FIG. 6N illustrates a game interface displaying an exemplary placement of a twelfth reel in one of a plurality of grids according to one or more aspects of the disclosed subject matter.

FIG. 6N illustrates the game interface 600 displaying an exemplary placement of a twelfth reel 670 in one of the plurality of grids 615 according to one or more aspects of the disclosed subject matter.

Referring to FIGS. 6A-6N, an exemplary slot game is illustrated. In one aspect, the game interface 600 can be an example of the game interface 5 in FIG. 1 and the slot game can be played using a slot game system (e.g., slot game system 100) using the slot game mechanics described in FIGS. 1-3.

Figure 7:
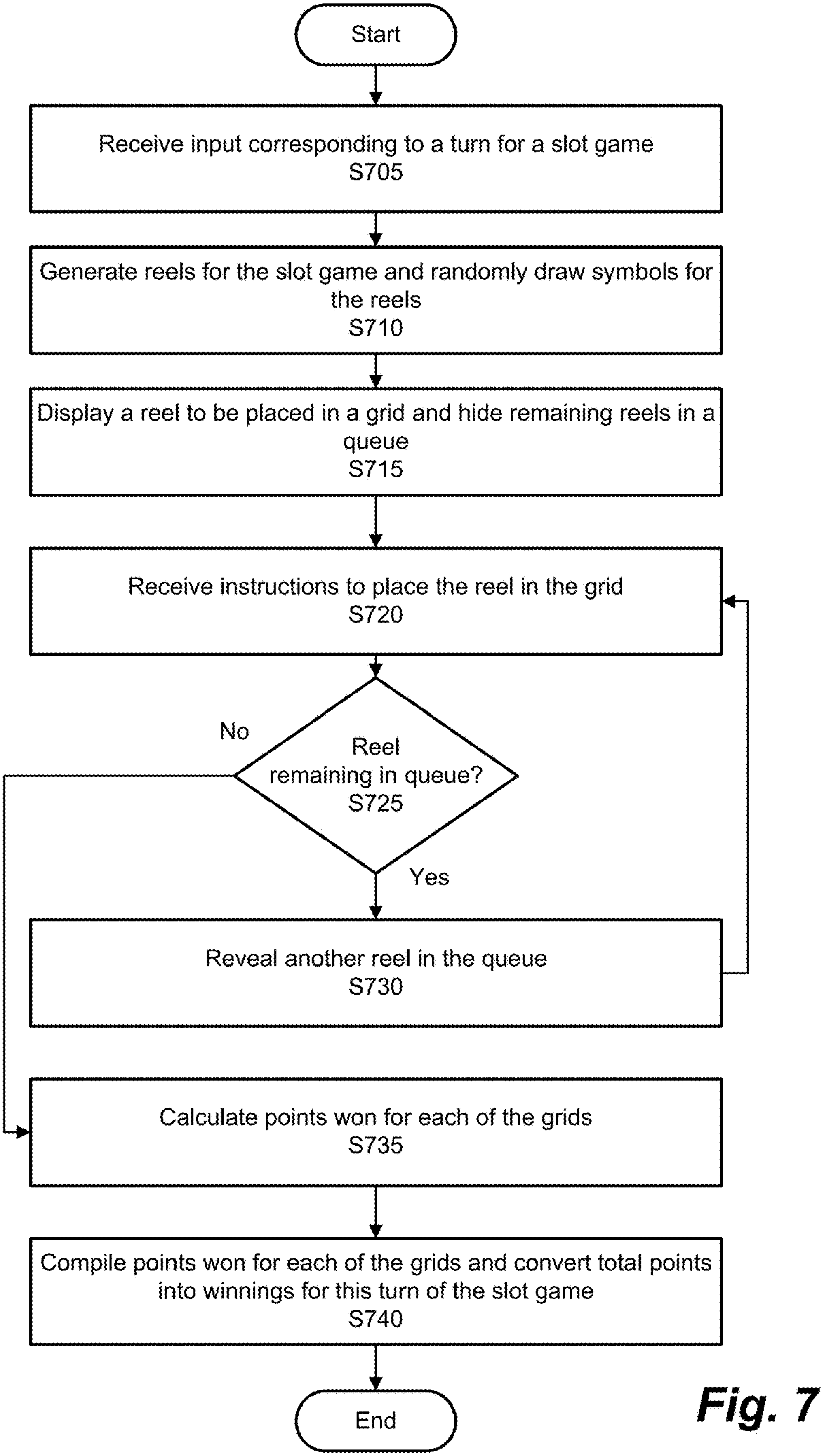
FIG. 7 is an exemplary flow chart for operating an interactive slot game.

FIG. 7 is an exemplary flow chart for operating an interactive slot game.

In S705, the slot game system 100 is configured to, by processing circuitry (e.g., computer 180), receive input corresponding to initiating a turn for a slot game.

In S710, the slot game system 100 is configured to, in response to the received input initiating the turn for the slot game, generate a plurality of reels for a slot game, wherein each of the plurality of reels is associated with a predetermined number of randomly drawn symbols.

In S715, the slot game system 100 is configured to display a reel of the plurality of reels and hide all remaining reels in a queue, wherein the remaining reels remain hidden until a predetermined action is performed by the slot game, wherein the predetermined action corresponds to placing the reel in one of one or more available grids in the slot game, and wherein the reel placement is based on a personal choice of a player.

In S720, the slot game system 100 is configured to receive instructions to place the reel in one of the available grids.

In S725, the slot game system 100 is configured to, in response to the reel being placed, determine whether there are reels remaining in the queue.

In S730, the slot game system 100 is configured to, in response to a determination that there are reels remaining in the queue, reveal another reel in the queue.

In S735, the slot game system 100 is configured to, in response to a determination that there are no reels remaining in the queue, calculate points won for each of the grids in which the reels are placed.

In S740, the slot game system 100 is configured to compile the points won for each of the grids to total points and convert the total points won into final winnings for the turn of the slot game (e.g., component 4 in FIG. 1).

The computing device on which the slot game system 100 and the system 200 is implemented may include a central processing unit, memory, input devices (e.g., keyboard and pointing devices), output devices (e.g., display devices), and storage devices (e.g., disk drives or other non-volatile storage media).

The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories.

The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on.

The computer systems may be cell phones, personal digital assistants, smart phones, tablets, personal computers, programmable consumer electronics, digital cameras, and so on.

The system may be described in the general context of computer executable instructions, such as program modules, executed by one or more computers or other devices. Generally, program modules include routines, programs, objects, components, data structures, and so on that perform tasks or implement abstract data types. Typically, the functionality of the program modules may be combined or distributed as desired in various embodiments.

In the above description of FIG. 2, FIG. 3, and FIG. 7, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 8:
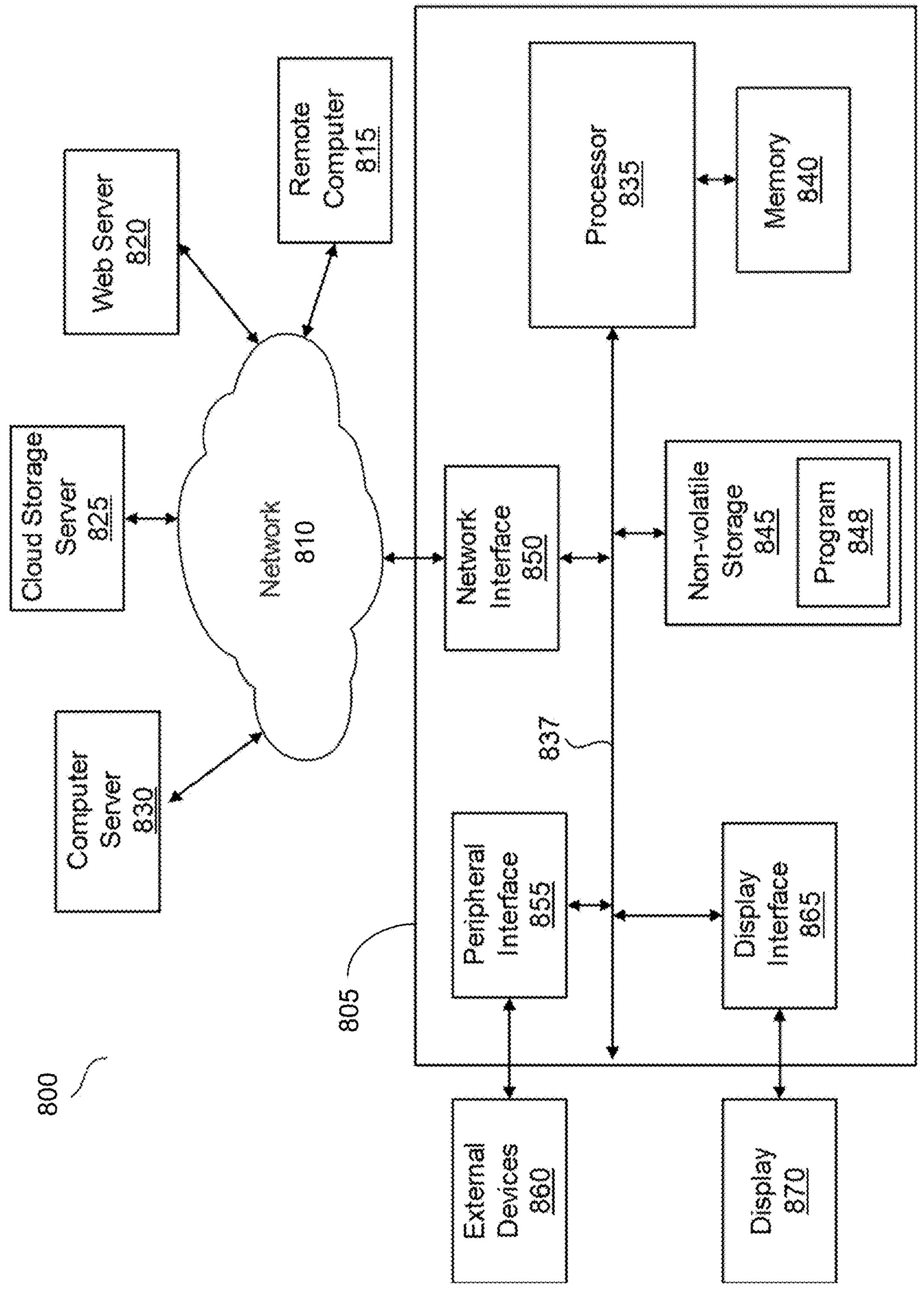
FIG. 8 is a block diagram of a computer-based system on which embodiments of the present system may be implemented.

FIG. 8 is a functional block diagram illustrating a networked system 800 of one or more networked computers and servers. In an embodiment, the hardware and software environment illustrated in FIG. 8 may provide an exemplary platform for implementation of the software and/or methods according to the present disclosure. For example, in one aspect, the computer 805 comprises processing circuitry and is included in or encompasses the computer 180 in FIG. 2, which is a component of the slot game system 100.

Referring to FIG. 8, a networked system 800 may include, but is not limited to, computer 805, network 810, remote computer 815, web server 820, cloud storage server 825 and computer server 830.

Additional detail of computer 805 is shown in FIG. 8. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A system characterized by a display of one or multiple grids, comprising:

a display;

a user interface;

a memory storing instructions; and processing circuitry executing the instructions configured to receive, via the user interface, input corresponding to initiating a turn for a slot game, in response to the received input initiating the turn for the slot game generate a plurality of reels for a slot game, create and maintain a data structure in memory for storing both placed reels and a queue of hidden reels to enable persistent state tracking, store the plurality of reels in the data structure maintained in the memory, wherein each of the plurality of reels is associated with a predetermined number of randomly drawn symbols, display, on the display, only a first reel of the plurality of reels and maintain all remaining reels hidden in the queue data structure, wherein the remaining reels remain hidden until a predetermined action is performed by the slot game, wherein the predetermined action corresponds to placing the displayed reel in one of one or more available grid positions in the slot game, wherein the reel placement is based on a personal choice of a player, receive, via the user interface, instructions to place the displayed reel in one of the available grid positions, in response to the reel being placed, determine whether there are reels remaining in the queue, in response to a determination that there are reels remaining in the queue, reveal a next reel in the queue on the display device while continuing to maintain all other remaining reels hidden, periodically store a current game state in memory including the position of all placed reels and the remaining reels in the queue to enable recovery of the game state in a case the player exits the game before completion, wherein the stored game state is configured to be synchronized across multiple devices to enable the player to continue the game on a different device without loss of progress.

2. The system of claim 1, wherein the processing circuitry is further configured to receive instructions to place the next reel in one of the available grids, wherein the instructions to place a reel are based on a choice of the player, wherein the reel placement defines in which grid of the slot game the reel is placed.

3. The system of claim 2, wherein the processing circuitry is further configured to in response to a determination that there are no reels remaining in the queue, calculate points won for each of the grids in which the reels are placed.

4. The system of claim 3, wherein the processing circuitry is further configured to compile the points won for each of the grids to total points.

5. The system of claim 2, wherein the processing circuitry is further configured to in response to a determination that there are no reels remaining in the queue, calculate points won for each special combination or feature.

6. The system of claim 1, wherein the processing circuitry is further configured to determine whether a player quits the slot game before the turn is completed, and in response to a determination that the player quit before the turn was completed, store a position of the placed reels and the remaining reels in the queue to be recovered when the player returns to the slot game.

7. A method, comprising:

receiving, by a user interface, input corresponding to initiating a turn for a slot game;

in response to the received input initiating the turn for the slot game generating a plurality of reels for a slot game;

creating and maintaining a data structure in memory for storing both placed reels and a queue of hidden reels to enable persistent state tracking;

storing the plurality of reels in the data structure maintained in the memory, wherein each of the plurality of reels is associated with a predetermined number of randomly drawn symbols;

displaying, on a display, only a first reel of the plurality of reels and hiding all remaining reels in the queue data structure, wherein the remaining reels remain hidden until a predetermined action is performed by the slot game, wherein the predetermined action corresponds to placing the displayed reel in one of one or more available grid positions in the slot game, and wherein the reel placement is based on a personal choice of a player;

receiving, by the user interface, instructions to place the displayed reel in one of the available grid positions;

in response to the reel being placed, determining whether there are reels remaining in the queue;

in response to a determination that there are reels remaining in the queue, revealing a next reel in the queue on the display while continuing to maintain all other remaining reels hidden;

periodically storing a current game state in memory including the position of all placed reels and the remaining reels in the queue to enable recovery of the game state in a case the player exits the game before completion, wherein the stored game state is configured to be synchronized across multiple devices to enable the player to continue the game on a different device without loss of progress.

8. The method of claim 7, further comprising:

receiving instructions to place the next reel in one of the available grids, wherein the instructions to place a reel are based on a choice of the player, wherein the reel placement defines in which grid of the slot game the reel is placed.

9. The method of claim 8, further comprising:

in response to a determination that there are no reels remaining in the queue, calculate points won for each of the grids in which the reels are placed.

10. The method of claim 9, further comprising:

compiling the points won for each of the grids to total points.

11. The method of claim 8, further comprising:

in response to a determination that there are no reels remaining in the queue, calculating points won for each special combination or feature.

12. The method of claim 7, further comprising:

determining whether a player quits the slot game before the turn is completed; and in response to a determination that the player quit before the turn was completed, storing a position of the placed reels and the remaining reels in the queue to be recovered when the player returns to the slot game.

13. A non-transitory computer-readable storage medium storing computer-readable instructions thereon which, when executed by a computer, cause the computer to perform a method, the method comprising:

receiving, by a user interface, input corresponding to initiating a turn for a slot game;

in response to the received input initiating the turn for the slot game generating a plurality of reels for a slot game;

creating and maintaining a data structure in memory for storing both placed reels and a queue of hidden reels to enable persistent state tracking;

storing the plurality of reels in the data structure maintained in the memory, wherein each of the plurality of reels is associated with a predetermined number of randomly drawn symbols;

displaying, on a display, only a first-a reel of the plurality of reels and hiding all remaining reels in the queue data structure, wherein the remaining reels remain hidden until a predetermined action is performed by the slot game, wherein the predetermined action corresponds to placing the displayed reel in one of one or more available grid positions in the slot game, and wherein the reel placement is based on a personal choice of a player;

receiving, by the user interface, instructions to place the displayed reel in one of the available grid positions;

in response to the reel being placed, determining whether there are reels remaining in the queue;

in response to a determination that there are reels remaining in the queue, revealing a next reel in the queue on the display while continuing to maintain all other remaining reels hidden;

periodically storing a current game state in memory including the position of all placed reels and the remaining reels in the queue to enable recovery of the game state in a case the player exits the game before completion, wherein the stored game state is configured to be synchronized across multiple devices to enable the player to continue the game on a different device without loss of progress.

14. The non-transitory computer-readable storage medium of claim 13, further comprising:

receiving instructions to place the next reel in one of the available grids, wherein the instructions to a place a reel are based on a choice of the player, wherein the reel placement defines in which grid of the slot game the reel is placed.

15. The non-transitory computer-readable storage medium of claim 14, further comprising:

in response to a determination that there are no reels remaining in the queue, calculate points won for each of the grids in which the reels are placed.

16. The non-transitory computer-readable storage medium of claim 15, further comprising:

compiling the points won for each of the grids to total points.

17. The non-transitory computer-readable storage medium of claim 14, further comprising:

in response to a determination that there are no reels remaining in the queue, calculating points won for each special combination or feature.

* * * * *